US012572882B2

(12) United States Patent
Dulebenets

(10) Patent No.: US 12,572,882 B2
(45) Date of Patent: Mar. 10, 2026

(54) SYSTEM OF AND METHOD FOR OPTIMIZING SCHEDULE DESIGN VIA COLLABORATIVE AGREEMENT FACILITATION

(71) Applicant: Florida A&M University, Tallahassee, FL (US)

(72) Inventor: Maxim A. Dulebenets, Tallahassee, FL (US)

(73) Assignee: Florida A&M University, Tallahassee, FL (US)

( * ) Notice: Subject to any disclaimer, the term of this patent is extended or adjusted under 35 U.S.C. 154(b) by 0 days.

(21) Appl. No.: 17/932,932

(22) Filed: Sep. 16, 2022

(65) Prior Publication Data

US 2024/0119399 A1      Apr. 11, 2024

(51) Int. Cl.
*G06Q 10/0831*        (2023.01)
*G06Q 10/04*          (2023.01)
        (Continued)

(52) U.S. Cl.
CPC ......... *G06Q 10/0831* (2013.01); *G06Q 10/04* (2013.01); *G06Q 10/06314* (2013.01);
        (Continued)

(58) Field of Classification Search
CPC ............................. G06Q 50/18; G06Q 50/188
See application file for complete search history.

(56) References Cited

U.S. PATENT DOCUMENTS 10,819,827 B1 * 10/2020 Aykin .............. G06Q 10/06311
2003/0216993 A1 * 11/2003 Goldwerger ........... G06Q 30/08
                                                            705/37

(Continued)

FOREIGN PATENT DOCUMENTS

JP          3973922 B2      9/2007
WO       2007090839 A1     8/2007
                (Continued)

OTHER PUBLICATIONS

Al-Khatib, S. (2015). Strategic logistics outsourcing: Integrated models for evaluating and selecting logistics service providers (LSPs) Upstream/Downstream supply chain comparison. (Year: 2015).*

(Continued)

*Primary Examiner* — Maria C Santos-Diaz
(74) *Attorney, Agent, or Firm* — Andrew Behrens; Trenam Law

(57)                     ABSTRACT

Described herein relates to a system of and method for optimizing schedule design, via facilitation of agreements, such as environmentally sustainable and/or multi-objective collaborative agreements, between at least one shipping vessel and at least one terminal operator. The present disclosure may include at least one multi-objective mathematical model to capture the proposed collaborative agreements. The first objective of the model may minimize the cost components that are mostly driven by the economic perspectives, while the second objective may minimize emission release components driven by the environmental perspectives. The present disclosure comprises a new multi-objective optimization method comprising the features of the ε-constraint model method and the goal-programming model method. In addition, the present disclosure may facilitate am analysis of trade-offs amongst the economic and environmental perspectives in the ship schedule design. Furthermore, the importance of environmentally sustainable collaborative agreements amongst shipping lines and terminal operators may be showcased as well.

19 Claims, 11 Drawing Sheets

(51) Int. Cl.
| | |
|---|---|
| *G06Q 10/0631* | (2023.01) |
| *G06Q 10/0639* | (2023.01) |
| *G06Q 10/0835* | (2023.01) |
| *G06Q 50/18* | (2012.01) |

(52) U.S. Cl.
CPC ... *G06Q 10/06393* (2013.01); *G06Q 10/0835* (2013.01); *G06Q 50/18* (2013.01)

(56) References Cited

U.S. PATENT DOCUMENTS

| | | | | |
|---|---|---|---|---|
| 2007/0208585 | A1* | 9/2007 | Bernhard | G06Q 10/04 705/336 |
| 2010/0287073 | A1* | 11/2010 | Kocis | G06Q 10/047 705/28 |
| 2015/0178649 | A1 | 6/2015 | Furman et al. | |
| 2015/0324714 | A1* | 11/2015 | Shao | G06Q 10/0832 705/7.27 |
| 2018/0005171 | A1* | 1/2018 | Harsha | G06Q 30/0201 |
| 2018/0315126 | A1* | 11/2018 | Laurent | G06Q 10/08 |
| 2019/0303859 | A1* | 10/2019 | Dulebenets | G06Q 10/0835 |
| 2019/0311324 | A1* | 10/2019 | Dulebenets | G06Q 10/06311 |
| 2022/0187830 | A1* | 6/2022 | Liu | G08G 3/00 |
| 2023/0115876 | A1* | 4/2023 | Avadhani | G06F 40/40 706/52 |

FOREIGN PATENT DOCUMENTS

| | | | | |
|---|---|---|---|---|
| WO | | 2009082454 | A1 | 7/2009 |
| WO | | 2015171286 | A1 | 11/2015 |
| WO | | WO-2022040748 | A1 * | 3/2022 ........... G08G 1/0112 |

OTHER PUBLICATIONS

Varelas, T., Archontaki, S., Dimotikalis, J., Turan, O., Lazakis, I., & Varelas, O. (2013). Optimizing ship routing to maximize fleet revenue at danaos. Interfaces, 43(1), 37-47. (Year: 2013).*

Abdurahim Alharbi et al. "Schedule design for sustainable container supply chain networks with port time windows" 2015, pp. 322-331. Advanced Engineering Informatics, Elsevier.

Eric Kulisch "Best Practices and Collaboration for Curbing Port Congestion" Aug. 2015, pp. 1-14. American Shipper.

N. Aydin et al. "Speed optimization and bunkering in liner shipping in the presence of uncertain service times and time windows at ports" 2017. pp. 143-154. European Journal of Operational Research, Elsevier. United Kingdom.

Bilge Bilgen et al. "A mixed-integer linear programming model for bulk grain blending and shipping" 2007. pp. 555-571.Int. J. Production Economics, Elsevier. Turkey.

Berit D. Brouer et al. "The Vessel Schedule Recovery Problem (VSRP)—A MIP model for handling disruptions in liner shipping" 2013 pp. 362-374. European Journal of Operational Research. Denmark.

Tzung-Nan Chuang et al. "Planning the route of container ships: A fuzzy genetic approach" 2010, pp. 2948-2956. Expert Systems with Applications. Taiwan.

Kalyanmoy Deb et al. "A Fast and Elitist Multiobjective Genetic Algorithm: NSGA-II" Apr. 2002, pp. 182-197.vol. 6, No. IEEE Transactions on Evolutionary Computation.

Yuquan Du et al. "Berth allocation considering fuel consumption and vessel emissions" 2011. pp. 1021-1037, 47. Transportation Research Part E, Elsevier. China.

Maxim A. Dulebenets "Bunker Consumption Optimization in Liner Shipping: A Metaheuristic Approach" International Jun. 2015. pp. 3766-3776, vol. 3 Issue: 6. Department of Civil Engineering and Intermodal Freight Transportation Institute. Memphis TN, USA.

M. A. Dulebenets "The Vessel Scheduling Problem in a Liner Shipping Route with Heterogeneous Fleet" 2018. pp. 19-32. Springer.

Maxim A. Dulebenets "Advantages and disadvantages from enforcing emission restrictions within emission control areas" 2017. pp. 107-132, Enforcing emission restrictions, Emerald. Tallahassee, Florida, USA.

M. A. Dulebenets et al. "The green vessel schedule design problem: consideration of emissions constraints" 2017. pp. 761-783, CrossMark. Memphis, TN USA.

Maxim A. Dulebenets et al. "Vessel scheduling in liner shipping: Modeling transport of perishable assets" 2018.pp. 141-156. 184 International Journal of Production Economics. Tallahassee, FL.

US EPA "Causes of Climate Change" May 29, 2019. pp. 1-7.

Kjetil Fagerholt et al. "Ship scheduling with soft time windows: An optimisation based approach" 2001. pp. 559-571. 131 European Journal of Operational Research, Elsevier. Trondheim, Norway.

Kjetil Fagerholt et al. "Transportation Research Part C" 2015. pp. 57-73, Part C 52 Transportation Research. Elsevier, Trondheim, Norway.

Kjetil Fagerholt et al. "On two speed optimization problems for ships that sail in and out of emission control areas" 2015 pp. 56-64. Part D 39 Transportation Research Part D. Lyngby, Denmark.

"Shipping Alliances: Mergers of small and large carriers" Nov. 8, 2016. pp. 1-8. Ocean freight news.

JOC Staff "Container shipping industry faces potential wave of consolidation" Nov. 9, 2015. pp. 1-6, MSC.

Greg Knowler "Japanese shipping merger to create new major liner" Nov. 1, 2016. pp. 1-6. MSC.

Dustin Braden "Hanjin Shipping bankruptcy timeline: How did we get here?" Sep. 15, 2016, pp. 1-7. MSC.

Christos A. Kontovas "The Green Ship Routing and Scheduling Problem (GSRSP): A conceptual approach" 2014, pp. 61-69 Part D 31. Transportation Research, Denmark.

Chen Li et al. "Disruption Recovery for a Vessel in Liner Shipping" Nov. 2015, pp. 900-921. vol. 49, No. 4, Informs.

Chen Li et al. "Real-time schedule recovery in liner shipping service with regular uncertainties and disruption events" 2015, pp. 1-27. Transportation Research Part B. Elsevier.

S. Afshin Mansouri et al. "Multi-objective decision support to enhance environmental sustainability in maritime shipping: A review and future directions" 2015, pp. 3-18. Transportation Research Part E 78. Elsevier, United Kingdom.

Qiang Meng et al. "Containership Routing and Scheduling in Liner Shipping: Overview and Future Research Directions" May 2014, pp. 265-280. vol. 48, No. 2,Nforms.

www.oocl.com "Our services, E services" pp. 1-6, Accessed May 29, 2019.

http://ports.com/sea-route/ "Sea route & distance" Accessed May 29, 2019.

Harilaos N. Psaraftis et aSpeed models for energy-efficient maritime transportation: A taxonomy and surveyl. (2013) pp. 331-351, Transportation Research Part C 26. Elsevier. Athens, Greece.

D Ronen "The effect of oil price on containership speed and fleet size" 2011. pp. 211-216, vol. 62, No. 1.Journal of the Operational Research Society. St Louis, USA.

Xiangtong Qi et al. "Minimizing fuel emissions by optimizing vessel schedules in liner shipping with uncertain port times" (2012), pp. 863-880, Part E 48. Elsevier.

Arno Schroten et al. "Methodology report" Sep. 2011. pp. 1-21. CE Delft.

Dong-Ping Song et al. "Multi-objective optimization for planning liner shipping service with uncertain port times" (2015), pp. 1-22. Part E 84, Elsevier. UK.

The Port Authority of New York & New Jersey "Marine Terminal". https://www.panynj.gov/port/tariffs.html accessed May 29, 2019.

"An empirical study of fleet expansion and growth of ship size in container liner shipping" Idea. https://idead/repec.org/a/eee/proeco/v159y2015icp241-253.html accessed May 29, 2019.

Nguyen Khoi Tran et al. "Container shipping route design incorporating the costs of shipping, inland/feeder transport, Inventory and CO2 emission" Mar. 2016, pp. 1-28. Macmillan Publishers Ltd.

Shuaian Wang et al. "Liner ship route schedule design with port time windows" (2014) pp. 1-17. Part C 41, Elsevier Australia.

Shuaian Wang "Liner ship route schedule design with sea contingency time and port time uncertainty" (2012) pp. 615-633. Part B 46, Elsevier Singapore.

Shuaian Wang et al. "Sailing speed optimization for container ships in a liner shipping network" (2012) pp. 701-714, Part E 48. Elsevier Singapore.

(56)     References Cited

OTHER PUBLICATIONS

Shuaian Wang et al. "Robust schedule design for liner shipping services" (2012) pp. 1093-1106. Part E 48, Elsevier Singapore.

Shuaian Wang et al. "Bunker consumption optimization methods in shipping: A critical review and extensions" (2013) pp. 49-62 Part E 53 Elsevier Australia.

Shuaian Wang et al. A note on "Berth allocation considering fuel consumption and vessel emissions" (2013) pp. 48-54 Part E 49. Elsevier Singapore.

Shuaian Wang et al. "Estimation of the perceived value of transit time for containerized cargoes" (2015) pp. 298-308 Part A 78. Elsevier.

https://datacatalog.worldbank.org/cost-import-us-container.com "Cost to import (US$ Per Container)" accessed May 29, 2019.

"Some Observations on Port Congestion, Vessel Size and Vessel Sharing Agreements" May 28, 2015. pp. 1-10.

Yang Ching Chiao et al."Assessing resources, logistics service capabilities, innovation capabilities and the performance of container shipping services in Taiwan" May 29, 2019, pp. 1-1.

Stephane Zampelli1 et al. "The berth allocation and quay crane assignment problem using a CP approach" Principles and Practice of Constraint Programming, 2013, pp. 1-18.

Lu Zhen et al. "Models on ship scheduling in transshipment hubs with considering bunker cost" (2016) pp. 111-121. 173 Elsevier China.

* cited by examiner (1) Jebel Ali, AE [10] → (2) Khalifa Port, AE [748] →
(3) Karachi, PK [589] → (4) Nhava Sheva, IN [429] →
(5) Mundra, IN [2,496] → (6) Jeddah, SA [3,035] →
(7) Tanger Med, MA [1,651] → (8) Rotterdam, NL
[341] → (9) Hamburg, DE [549] → (10) London
Gateway Port, GB [181] → (11) Antwerp, BE [244] →
(12) Le Havre, FR [1,397] → (13) Tanger Med, MA
[3,035] → (14) Jeddah, SA [2,371] → (1) Jebel Ali, AE Europe Pakistan India Consortium 2 (EPIC-2)

*Notations*

- Corner point $F_1^*$ – the PF point with the $F_1$ minimum value;
- Corner point $F_2^*$ – the PF point with the $F_2$ minimum value;
- $F_1(F_2^*)$ – the value of $F_1$ objective function at the corner point $F_2^*$;
- $F_2(F_1^*)$ – the value of $F_2$ objective function at the corner point $F_1^*$.

SYSTEM OF AND METHOD FOR OPTIMIZING SCHEDULE DESIGN VIA COLLABORATIVE AGREEMENT FACILITATION

BACKGROUND OF THE INVENTION

1. Field of the Invention

This invention relates, generally, to shipping scheduling for shipping vessels. More specifically, it relates to a system of and method for optimizing schedule design, via facilitation of agreements, such as environmentally sustainable and/or multi-objective collaborative agreements, between at least one shipping vessel and at least one terminal operator of at least one port.

2. Brief Description of the Prior Art

A significant amount of goods are transported by ocean-going shipping vessels around the world. More specifically, the global seaborne trade reached 11.08 billion tons in 2019 with more than 800 million twenty-foot equivalent units (hereinafter "TEUs") handled at terminal operators worldwide (*UNCTAD*, 2020). However, the COVID-19 pandemic had significant effects on liner shipping and maritime transportation overall. In fact, some marine container terminals even decided to close due to the fact that the terminal employees were infected with the virus (*JOC*, 2020). Because of this, certain shipping vessels were required to wait for an extended period of time before they could be served due to container terminal shutdowns.

Although the seaborne trade volumes reduced approximately by 4% during the year of 2020 due to the COVID-19 disruptions, the seaborne trade is expected to recover and expand again in the years of 2021 and 2022 (*UNCTAD*, 2020). This, however, is not entirely beneficial, as increased seaborne trade comes with increased emissions. Sustainable container shipping is essential for the future development of maritime transportation. Shipping lines must keep in mind not only the economic perspectives that are associated with serving the existing and new customers along with attaining the target profit margins, but also the environmental perspectives as well. The amount of emissions produced by oceangoing shipping vessels has been ranked as "high" by the International Maritime Organization (hereinafter "IMO") and other relevant agencies continuously for several years. (*UNCTAD*, 2020).

Several different measures have been introduced to decrease the amount of greenhouse gas emissions (mostly $CO_2$, $CH_4$, and $N_2O$) and non-greenhouse gas emissions (mostly $NO_x$, $SO_x$, and PM) from maritime transportation. Currently known shipping emission reduction techniques generally rely on establishing emission regulations, such as Emission Control Areas (hereinafter "ECAs"), through certain geographical areas, including the English Channel, the Baltic Sea, the North Sea, and the Northern American coastline (Yang et al., 2019; Dong and Lee, 2020; Ma et al., 2021). Furthermore, the Chinese authorities declared certain areas of the Chinese coastline as ECAs (e.g., the Pearl Delta, the Yangtze Delta, and the Bohai Bay). Any shipping vessels sailing inside ECAs are mandated to use the fuel with no more than 0.10% m/m (mass by mass) of sulfur. Moreover, starting 1 Jan. 2020, a new limit on the content of sulfur was introduced by the IMO for shipping vessels sailing outside the designated ECAs (the regulation known as "IMO 2020"). Additionally, shipping lines continue exploring other strategies for reducing the emissions produced that include, but are not solely limited to, the following (Bouman et al., 2017; Peng et al., 2021; Tang et al., 2021): (i) use of shore power when shipping vessels are anchored at berthing positions instead of using auxiliary engines and burning additional fuel throughout the service of shipping vessels at ports; (ii) application of various carbon taxation schemes; (iii) improvement of ship design (e.g., use a specific shape of the ship hull); (iv) enhancing the operation of power and propulsion systems; (v) consideration of alternative fuel and energy sources (e.g., biofuels, liquefied natural gas, solar energy); (vi) improvement of ship maintenance activities; and others.

Nevertheless, many of the aforementioned alternatives come with substantial drawbacks. Not all shipping vessels are required to follow the applied ECAs and additional regulations (e.g., a shipping vessel may select an alternative route that does not pass through an ECA). However, shipping vessels are mandated to comply with the ECA regulations when they navigate in the vicinity of ports, which are located within the ECA boundaries. Thus, currently known shipping emission reduction techniques will not be effective enough to meet the long-term IMO target of reducing the total annual greenhouse gas emissions by 50% when comparing the 2008 and 2050 emission levels (UNCTAD, 2020).

Unlike many existing alternatives for emission reduction, collaborative agreements do not require significant monetary investments and may be executed amongst the relevant stakeholders by simply utilizing the available resources in a more effective manner. However, the collaborative agreements that have been proposed and evaluated in the ship scheduling literature are quite limited. In reality, more comprehensive collaborative agreements may exist between terminal operators, where terminal operators may collaborate with each other and share the available capacity to serve the arriving shipping vessels (Imai et al., 2008)—such as FIG. 1, where terminal operators "MT-1", "MT-2", and "MT-3" have a collaborative agreement and share the available capacity (i.e., berthing space, arrival time windows, handling equipment, etc.) for the ship service.

Accordingly, what is needed is easy-to-use, efficient, and sustainable schedule optimization technique which facilitates collaborative agreements and/or captures optimal emission and/or economic preferences amongst the at least one shipping vessel and/or terminal operator. However, in view of the art considered as a whole at the time the present invention was made, it was not obvious to those of ordinary skill in the field of this invention how the shortcomings of the prior art could be overcome.

SUMMARY OF THE INVENTION

The long-standing but heretofore unfulfilled need, stated above, is now met by a novel and non-obvious invention disclosed and claimed herein. In an aspect, present disclosure pertains to a method of automatically facilitating at least one optimal contract component of an agreement. In an embodiment, the method may comprise the following steps: (A) providing a processor of a computing device, such that the computing device may be in communication with at least one shipping vessel, alternative shipping vessel, and/or terminal operator; (B) selecting, via the processor of the computing device, at least one objective preference to be implemented into the agreement, by the following: (i) calculating, in-real time, via the computing device, at least one economic and/or environmental metric depending on at least one standard metric estimate of the at least one shipping vessel, alternative shipping vessel, and/or terminal operator; (ii) modeling, via the computing device, each of the economic and/or environmental metrics based on the at least one standard metric estimate of the at least one shipping vessel, alternative shipping vessel, and/or terminal operator; (iii) evaluating, via the computing device, the model associated with each of the economic and/or environmental metrics; and (iv) determining via the computing device, one of the at least one economic and/or environmental metrics associated with the optimal model; (C) loading, into a memory of the computing device, the agreement; (D) transmitting, via the processor of the computing device, a contract query to the agreement, such that the contract query may include the at least one selected objective preference; (E) receiving, via the agreement of the computing device, at least one standard contract component; (F) comparing, via the processor of the computing device, the at least one selected objective preference with the at least one received contract component; and (G) automatically facilitating, via the processor of the computing device, the at least one optimal contract component of the agreement by the following: (v) based on a determination that the at least one received standard contract component matches the at least one selected objective preference, deactivating the at least one objective preference; and (vi) based on a determination that the at least one received standard contract component does not match the at least one selected objective preference, activating the at least one objective preference and converting the at least one received standard contract component to the at least one objective preference according to the at least one metric of the optimal model.

In an embodiment, the method of the present disclosure may further comprise the following steps of, after automatically facilitating the at least one optimal contract component of the agreement, transmitting at least one notification to at least one user indicative of successful optimization of the at least one contract component and/or displaying the at least one optimal contract component on at least one display device associated with the computing device. Additionally, in an embodiment, the at least one display device associated with the computing device may comprise at least one user interface, the at least one display device comprising a surface configured to be interacted with by the at least one user and/or where the at least one display device is in communication with the processor, such that the at least one user may accept and/or decline the at least one optimal contract component and/or maintain the at least one received standard contract component of the agreement.

In some embodiments, the method of the present disclosure may further comprise the following steps of, after automatically facilitating the at least one optimal contract component of the agreement: (H) updating, via the processor of the computing device, the model, wherein the model may comprise an ECON-GP method, whereby the ECON-GP method may be configured to integrate the at least one objective preference and/or the at least one standard contract component as at least one data point in the model, by: (vii) based on a determination that the at least one received standard contract component matches the at least one selected objective preference, deactivating the at least one objective preference; and (viii) based on a determination that the at least one received standard contract component does not match the at least one selected objective preference, activating the at least one objective preference and converting the at least one received standard contract component to the at least one objective preference; and (I) displaying, via the processor of the computing device, at least one updated SSP-CATL model on the display device associated with the computing device. In some embodiments the ECON-GP method may comprise at least one aspect of an ECON method and/or a GP method.

In some embodiments, the method of the present disclosure may further comprise the following step of, after automatically facilitating the at least one optimal contract component of the agreement, receiving an instruction to unload, from the memory of the computing device, the at least one received standard contract component. Additionally, in these other embodiments, the step of, after automatically facilitating the at least one optimal contract component of the agreement, may further include the following step of, after receiving the instruction to unload the at least one standard contract component, receiving at least one alternative standard contract component, via the agreement.

Moreover, in some embodiments, the agreement may be a collaborative agreement between at least one shipping vessel and/or at least one terminal operator. Accordingly, in these other embodiments, the method of the present disclosure may further comprise the following step of, after automatically facilitating the at least one optimal contract component of the agreement, optimizing at least one metric of the at least one shipping vessel, terminal operator, or both, based on the at least one optimal contract component of the agreement. As such, the at least one metric may comprise the following, including but not limited to at least one output of at least one engine of the at least one shipping vessel, a speed of the at least one shipping vessel, at least one service output by at least one designated handling equipment type of the at least one terminal operator, at least one payload of the at least one shipping vessel, and/or a combination of thereof. Furthermore, in these other embodiments, the at least one shipping vessel may be configured to be in communication with the at least one terminal operator and/or at least one alternative shipping vessel, such that, based on the at least one optimal contract component, the at least one shipping vessel may be configured to be diverted for service to the at least one terminal operator and/or at least one alternative terminal operator, the at least one alternative shipping vessel may be added and/or removed, and/or the at least one alternative shipping vessel may be configured to be diverted for service to the at least one terminal operator and/or at least one alternative terminal operator, optimizing a service efficiency of the at least one shipping vessel by allowing the at least one shipping vessel to meet at least one service frequency requirement of the at least one agreement.

Additionally, another aspect of the present disclosure pertains to an agreement optimization system for automatically facilitating at least one optimal contract component of an agreement. In an embodiment, the agreement optimization system may comprise a computing device having a processor, such that the computing device may be in communication with at least one shipping vessel, at least one terminal operator, or both. Additionally, in this embodiment, the agreement optimization system may comprise a non-transitory computer-readable medium operably coupled to the processor, such that the computer-readable medium may have computer-readable instructions stored thereon that, when executed by the processor, cause the agreement optimization system to automatically facilitate at least one optimal contract component of an agreement by executing the computer-readable instructions. As such, the computer-readable instructions may comprise the following: (A) selecting, via the processor of the computing device, at least one objective preference to be implemented into the agreement, by the following: (i) calculating, in-real time, via the computing device, at least one economic and/or environmental metric depending on at least one standard metric estimate of the at least one shipping vessel, alternative shipping vessel, and/or terminal operator; (ii) modeling, via the computing device, each of the economic and/or environmental metrics based on the at least one standard metric estimate of the at least one shipping vessel, alternative shipping vessel, and/or terminal operator; (iii) evaluating, via the computing device, the model associated with each of the economic and/or environmental metrics; and (iv) determining via the computing device, one of the at least one economic and/or environmental metrics associated with the optimal model; (B) loading, into a memory of the computing device, the agreement; (C) transmitting, via the processor of the computing device, a contract query to the agreement, such that the contract query may include the at least one selected objective preference; (D) receiving, via the agreement of the computing device, at least one standard contract component; (E) comparing, via the processor of the computing device, the at least one selected objective preference with the at least one received contract component; and (F) automatically facilitating, via the processor of the computing device, the at least one optimal contract component of the agreement by the following: (v) based on a determination that the at least one received standard contract component matches the at least one selected objective preference, deactivating the at least one objective preference; and (vi) based on a determination that the at least one received standard contract component does not match the at least one selected objective preference, activating the at least one objective preference and converting the at least one received standard contract component to the at least one objective preference according to the at least one metric of the optimal model.

In an embodiment, the executed instructions of the agreement optimization system may further comprise the following steps of, after automatically facilitating the at least one optimal contract component of the agreement, transmitting at least one notification to at least one user indicative of successful optimization of the at least one contract component and/or displaying the at least one optimal contract component on at least one display device associated with the computing device. Additionally, in an embodiment, the at least one display device associated with the computing device may comprise at least one user interface, the at least one display device comprising a surface configured to be interacted with by the at least one user and/or where the at least one display device is in communication with the processor, such that the at least one user may accept and/or decline the at least one optimal contract component and/or maintain the at least one received standard contract component of the agreement.

In some embodiments, the executed instructions of the agreement optimization system may further comprise the following steps of, after automatically facilitating the at least one optimal contract component of the agreement: (G) updating, via the processor of the computing device, the model, wherein the model may comprise an ECON-GP method, whereby the ECON-GP method may be configured to integrate the at least one objective preference and/or the at least one standard contract component as at least one data point in the model, by: (vii) based on a determination that the at least one received standard contract component matches the at least one selected objective preference, deactivating the at least one objective preference; and (viii) based on a determination that the at least one received standard contract component does not match the at least one selected objective preference, activating the at least one objective preference and converting the at least one received standard contract component to the at least one objective preference; and (H) displaying, via the processor of the computing device, at least one updated SSP-CATL model on the display device associated with the computing device. In some embodiments the ECON-GP method may comprise at least one aspect of an ECON method and/or a GP method.

In some embodiments, the executed instructions of the agreement optimization system may further comprise the following step of, after automatically facilitating the at least one optimal contract component of the agreement, receiving an instruction to unload, from the memory of the computing device, the at least one received standard contract component. In this manner, in these other embodiments, the executed instructions may then further include the following step of, after automatically facilitating the at least one optimal contract component of the agreement and receiving the instruction to unload the at least one standard contract component, receiving at least one alternative standard contract component, via the agreement.

Moreover, in some embodiments, the agreement implemented into the agreement optimization system may comprise a collaborative agreement between at least one shipping vessel and/or at least one terminal operator. In addition, in some embodiments, the executed instructions of the agreement optimization system may further include the step of, after automatically facilitating the at least one optimal contract component of the agreement, optimizing at least one metric of the at least one shipping vessel and/or terminal operator, based on the at least one optimal contract component of the agreement.

Furthermore, in some embodiments, the at least one shipping vessel may be configured to be in communication with the at least one terminal operator, and/or at least one alternative shipping vessel, such that based on the at least one optimal contract component, the at least one shipping vessel may be configured to be diverted for service to the at least one terminal operator and/or at least one alternative terminal operator, the at least one alternative shipping vessel may be added and/or removed, and/or the at least one alternative shipping vessel may be configured to be diverted for service to the at least one terminal operator and/or at least one alternative terminal operator, optimizing a service efficiency of the at least one shipping vessel by allowing the at least one shipping vessel to meet a service frequency requirement of the agreement.

Finally, in another aspect, the present disclosure pertains to a method of automatically facilitating at least one environmentally optimal contract component of an agreement between at least one shipping vessel and at least one terminal operator. In an embodiment, the method may comprise the following steps of: (A) providing a computer with a graphical user interface and a processor, such that the computer may be in communication with at least one shipping vessel, alternative shipping vessel, and/or terminal operator; (B) selecting, via the processor of a computing device, at least one environmental preference to be implemented into the agreement, by: (i) calculating, via the computing device, at least one environmental metric depending on at least one standard metric estimate of the at least one shipping vessel, alternative shipping vessel, and/or at least one terminal operator; (ii) modeling, via the computing device, each of the environmental metrics based on the at least one standard metric estimate of the at least one shipping vessel, alternative shipping vessel, and/or terminal operator; (iii) evaluating, via the computing device, the model associated with each of the environmental metrics; and (iv) determining via the computing device, one of the at least one environmental metrics associated with the optimal model; (C) loading, into a memory of the computing device, the agreement; (D) transmitting, via the processor of the computing device, a contract query to the agreement, the contract query including the at least one selected environmental preference; (E) receiving, via the agreement of the computing device, at least one standard contract component; (F) comparing, via the processor of the computing device, the at least one selected environmental preference with the at least one received contract component; (G) automatically facilitating, via the processor of the computing device, the at least one environmentally optimal contract component of the agreement by: (v) based on a determination that the at least one received standard contract component matches the at least one selected environmental preference, deactivating the at least one environmental preference; and (vi) based on a determination that the at least one received standard contract component does not match the at least one selected environmental preference, activating the at least one objective preference and converting the at least one received standard contract component to the at least one environmental preference according to the at least one metric of the optimal model; and (H) environmentally optimizing at least one metric of at least one shipping vessel, alternative shipping vessel, and/or terminal operator based on the environmentally optimal contract component of the agreement.

In an embodiment, the method of the present disclosure may further include the following steps: after automatically facilitating the at least one optimal contract component of the agreement, (h) receiving an instruction to unload, from the memory of the computing device, the at least one contract component; (iii) based on a determination that the at least one received standard contract component matches the at least one selected objective preference, after receiving the instruction to unload the at least one contract component, maintaining the at least one standard contract component; and (iv) based on a determination that the at least one received standard contract component failed to match the at least one selected objective preference, after receiving the instruction to unload the at least one contract component, activating the at least one objective preference and converting the at least one received standard contract component to the at least one objective preference.

In addition, in an embodiment, the at least one metric may comprise the following group, including but not limited to at least one an output of at least one engine of the at least one shipping vessel, a speed of the at least one shipping vessel, at least one service output by at least one designated handling equipment type of the at least one terminal operator, at least one payload of the at least one shipping vessel, a total amount of shipping vessels, a total amount of alternative shipping vessels, a total amount of terminal operators, and/or a combination of thereof.

In some embodiments, the at least one shipping vessel may be configured to be in communication with the at least one terminal operator and/or at least one alternative shipping vessel, such that based on the at least one optimal contract component, the at least one shipping vessel may be configured to be diverted for service at the at least one terminal operator, and/or the at least one alternative shipping vessel may be added and/or removed, optimizing a service efficiency of the at least one shipping vessel by allowing the at least one shipping vessel to meet a service frequency requirement of the agreement.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not restrictive.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which:

FIG. 4A is a schematic illustration of a ship sailing in a partially laden mode. FIG. 4B is a schematic illustration of a ship sailing in a fully laden mode.

FIG. 5A graphically depicts a model generated by an ECON method having an insufficient PF density. FIG. 5B graphically depicts a model generated by an ECON-GP method having generated at least one additional PF point.

FIG. 8A graphically depicts a PF model obtained by an ECON method for a problem instance #1. FIG. 8B graphically depicts a PF model obtained by an ECON method for a problem instance #2. FIG. 8C graphically depicts a PF model obtained by an ECON method for a problem instance #3. FIG. 8D graphically depicts a PF model obtained by an ECON method for a problem instance #4. FIG. 8E graphically depicts a PF model obtained by an ECON-GP method for a problem instance #1. FIG. 8F graphically depicts a PF model obtained by an ECON-GP method for a problem instance #2. FIG. 8G graphically depicts a PF model obtained by an ECON-GP method for a problem instance #3. FIG. 8H graphically depicts a PF model obtained by an ECON-GP method for a problem instance #4.

FIG. 10A graphically depicts a PF model obtained by an ECON-GP method for generated scenarios of collaborative agreements and a problem instance #1. FIG. 10B graphically depicts a PF model obtained by an ECON-GP method for generated scenarios of collaborative agreements and a problem instance #2. FIG. 10C graphically depicts a PF model obtained by an ECON-GP method for generated scenarios of collaborative agreements and a problem instance #3. FIG. 10D graphically depicts a PF model obtained by an ECON-GP method for generated scenarios of collaborative agreements and a problem instance #4. FIG. 10E graphically depicts a PF model obtained by an ECON-GP method for generated scenarios of collaborative agreements and a problem instance #5. FIG. 10F graphically depicts a PF model obtained by an ECON-GP method for generated scenarios of collaborative agreements and a problem instance #6. FIG. 10G graphically depicts a PF model obtained by an ECON-GP method for generated scenarios of collaborative agreements and a problem instance #7. FIG. 10H graphically depicts a PF model obtained by an ECON-GP method for generated scenarios of collaborative agreements and a problem instance #8. FIG. 10I graphically depicts a PF model obtained by an ECON-GP method for generated scenarios of collaborative agreements and a problem instance #10. FIG. 10J graphically depicts a PF model obtained by an ECON-GP method for generated scenarios of collaborative agreements and a problem instance #10. FIG. 10K graphically depicts a PF model obtained by an ECON-GP method for generated scenarios of collaborative agreements and a problem instance #11. FIG. 10L graphically depicts a PF model obtained by an ECON-GP method for generated scenarios of collaborative agreements and a problem instance #12.

FIG. 11A graphically depicts a PF model obtained by an ECON-GP method for generated scenarios of collaborative agreements and a problem instance #13. FIG. 11B graphically depicts a PF model obtained by an ECON-GP method for generated scenarios of collaborative agreements and a problem instance #14. FIG. 11C graphically depicts a PF model obtained by an ECON-GP method for generated scenarios of collaborative agreements and a problem instance #15. FIG. 11D graphically depicts a PF model obtained by an ECON-GP method for generated scenarios of collaborative agreements and a problem instance #16. FIG. 11E graphically depicts a PF model obtained by an ECON-GP method for generated scenarios of collaborative agreements and a problem instance #17. FIG. 11F graphically depicts a PF model obtained by an ECON-GP method for generated scenarios of collaborative agreements and a problem instance #18. FIG. 11G graphically depicts a PF model obtained by an ECON-GP method for generated scenarios of collaborative agreements and a problem instance #19. FIG. 11H graphically depicts a PF model obtained by an ECON-GP method for generated scenarios of collaborative agreements and a problem instance #20.

DETAILED DESCRIPTION OF THE INVENTION

Figure 1:
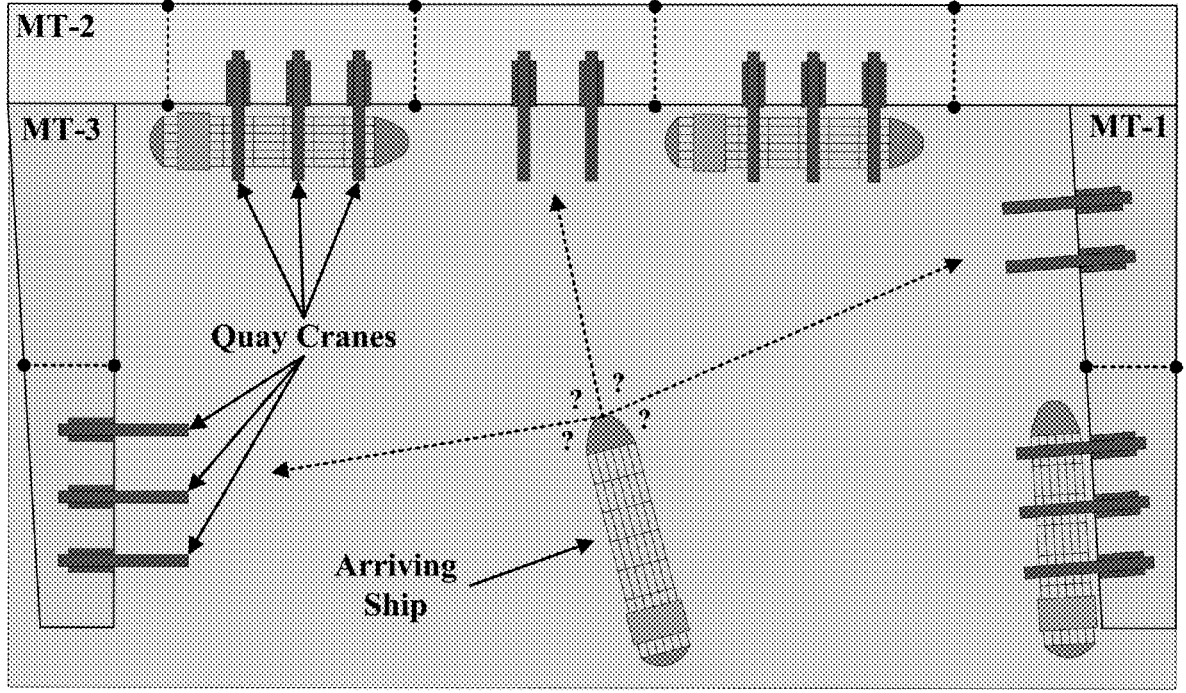
FIG. 1 depicts a collaborative service of arriving shipping vessels at a port, as previously known in the art.

In the following detailed description of the preferred embodiments, reference is made to the accompanying drawings, which form a part thereof, and within which are shown by way of illustration specific embodiments by which the invention may be practiced. It is to be understood that one skilled in the art will recognize that other embodiments may be utilized, and it will be apparent to one skilled in the art that structural changes may be made without departing from the scope of the invention. Elements/components shown in diagrams are illustrative of exemplary embodiments of the disclosure and are meant to avoid obscuring the disclosure. Any headings, used herein, are for organizational purposes only and shall not be used to limit the scope of the description or the claims. Furthermore, the use of certain terms in various places in the specification, described herein, are for illustration and should not be construed as limiting.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. The appearances of the phrases "in one embodiment," "in an embodiment," "in embodiments," "in alternative embodiments," "in an alternative embodiment," or "in some embodiments" in various places in the specification are not necessarily all referring to the same embodiment or embodiments. The terms "include," "including," "comprise," and "comprising" shall be understood to be open terms and any lists that follow are examples and not meant to be limited to the listed items.

Definitions

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain or store a program for use by or in connection with an instruction execution system, apparatus, or device.

A computer readable signal medium may include a propagated data signal with computer readable program PIN embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program PIN embodied on a computer readable medium may be transmitted using any appropriate medium, including but not limited to wireless, wireline, optical fiber cable, radio frequency, etc., or any suitable combination of the foregoing. Computer program PIN for carrying out operations for aspects of the present invention may be written in any combination of one or more programming languages, including an object oriented programming language such as Java, C#, C++, Python, MATLAB, AutoCAD, and/or the like and/or conventional procedural programming languages, such as the "C" programming language and/or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computing device, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As used herein, "about" means approximately or nearly and in the context of a numerical value or range set forth means ±15% of the numerical.

As used herein, the term "shipping vessel" refers to any device known in the art which may be used to transport at least one item and/or entity from one location to another along a designated maritime passage and/or route. The shipping vessel may be a ferry, a submarine, a cruiser, a yacht, and/or a cargo ship, including but not limited to a freighter, a "Panamax" vessel, a "Panamax-Max" vessel, a "Post-Panamax" vessel, a "Neo-Panamax" vessel, and/or a "Triple E" vessel. For ease of reference, the exemplary embodiment described herein refers to a cargo ship, but this description should not be interpreted as exclusionary of other transport devices.

As used herein, the term "terminal operator" refers to any entity known in the art which may accept, decline, hold, remove and/or transport at least one payload of the shipping vessel. The terminal operator may be an intake station of a port, including but not limited to a public port, a private port, a landlord port, and/or a tool port. For ease of reference, the exemplary embodiment described herein refers to an intake station of the port, but this description should not be interpreted as exclusionary of other station entities.

As used herein, the term "alternative shipping vessel" refers to any device known in the art used to transport at least one item and/or entity from one location to another which may be used to supplement and/or aid the shipping efficiency of the shipping vessel, as defined above. The alternative shipping vessel may be a ferry, a submarine, a cruiser, a yacht, and/or a cargo ship, including but not limited to a freighter, a "Panamax" vessel, a "Panamax-Max" vessel, a "Post-Panamax" vessel, a "Neo-Panamax" vessel, and/or a "Triple E" vessel. For ease of reference, the exemplary embodiment described herein refers to a cargo ship, but this description should not be interpreted as exclusionary of other alternative transport devices.

As used herein, the term "shipping schedule user" refers to any human, corporation, and/or entity known in the art which may require a collaborative shipping agreement. The shipping schedule user may comprise a shipping vessel, a plurality of shipping vessels, a terminal operator, a plurality of terminal operators, a governmental entity, and/or an international governmental entity. For ease of reference, the exemplary embodiment described herein refers to at least one shipping vessel and at least one terminal operator, but this description should not be interpreted as exclusionary of other shipping schedule users.

As used herein, the term "contract component" refers to any aspect known in the art which may be pertinent to at least one collaborative shipping agreement between at least one shipping vessel and at least one terminal operator. For ease of reference, the exemplary embodiment described herein refers to fuel cost, amount of terminal operators to be visited, travel time, emissions released by shipping vessels, and/or port service frequency, but this description should not be interpreted as exclusionary of other aspects pertinent to at least one shipping agreement between at least one shipping vessel and at least one terminal operator.

As used herein, the term "objective preference" refers to any component known in the art which may be pertinent to the at least one collaborative shipping agreement between at least one shipping vessel and at least one terminal operator, such that the component is optimized. For ease of reference, the exemplary embodiment described herein includes fuel cost, vessel operating and/or chartering costs, container inventory cost, cost of vessel late arrivals at ports, travel time, emissions released by the shipping vessel, and/or vessel handling cost, but this description should not be interpreted as exclusionary of other aspects pertinent to at least one shipping agreement between at least one shipping vessel and at least one terminal operator.

As used herein, the term "economic perspective" refers to any aspect known in the art which may be pertinent to economic optimization and/or efficiency in regard to a shipping vessel and/or a terminal operator. For ease of reference, the exemplary embodiment described herein refers to the average speed of the at least one shipping vessel and/or alternative shipping vessel which may be weighted by each portion of the at least one shipping route, the total waiting time of the at least one shipping vessel and/or alternative shipping vessel at the at least one port, the total handling time of the at least one shipping vessel and/or alternative shipping vessel at the at least one port, the total shipping time of the at least one shipping vessel and/or alternative shipping vessel for the at least one shipping route, the total late arrivals of the at least one shipping vessel and/or alternative shipping vessel at the at least one port, and/or the total fuel consumption of the at least one shipping vessel and/or alternative shipping vessel, but this description should not be interpreted as exclusionary of other economic aspects.

As used herein, the term "environmental perspective" refers to any aspect known in the art which may be pertinent to environmental optimization and/or emission reduction in regard to a shipping vessel and/or a terminal operator. For ease of reference, the exemplary embodiment described herein refers to the total emission released value of the at least one shipping vessel and/or alternative shipping vessel for the at least one shipping route not at the at least one terminal operator, the total emission released value of the at least one shipping vessel and/or alternative shipping vessel at the at least one port, the total number of vessels deployed, the total number of own vessels deployed, and/or the total number of alternative vessels deployed, but this description should not be interpreted as exclusionary of other environmental aspects.

As used herein, the terms "communicate" and "communication" refer to any manner known in the art in which a shipping vessel may correspond with at least one alternative shipping vessel and/or at least one terminal operator. The shipping vessel may correspond by Bluetooth, Wi-Fi, electrical signals, cellular devices, and/or radio frequency. For ease of reference, the exemplary embodiment described herein refers to electrical signals, but this description should not be interpreted as exclusionary of other correspondence devices and/or methods.

All numerical designations, including ranges, are approximations which are varied up or down by increments of 1.0, 0.1, 0.01 or 0.001 as appropriate. It is to be understood, even if it is not always explicitly stated, that all numerical designations are preceded by the term "about". It is also to be understood, even if it is not always explicitly stated, that the compounds and structures described herein are merely exemplary and that equivalents of such are known in the art and may be substituted for the compounds and structures explicitly stated herein.

Wherever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Wherever the term "no more than," "less than," or "less than or equal to" precedes the first numerical value in a series of two or more numerical values, the term "no more than," "less than" or "less than or equal to" applies to each of the numerical values in that series of numerical values. For example, less than or equal to 1, 2, or 3 is equivalent to less than or equal to 1, less than or equal to 2, or less than or equal to 3.

Environmental/Economic Schedule Design Optimization

The present disclosure pertains to a system of and method for optimizing schedule design, via facilitation of agreements between at least one shipping vessel and at least one terminal operator, via incorporating at least one objective preference and/or converting at least one standard contract component of the at least one comprehensive collaborative agreement with the at least one objective preference, on a computing device, particularly for at least one shipping vessel, alternative shipping vessel, and/or at least one terminal operator. As such, in an embodiment, the present disclosure comprises a system and method of automatically queuing a predetermined amount of objective preferences and providing either the ability to input the objective preference into the collaborative agreement, such that at least one standard contract component of the at least one collaborative agreement may be modified, restructured, and/or replaced with the objective preference, such that the shipping efficiency of the at least one shipping vessel, alternative shipping vessel, and/or terminal operator may optimize at least one economic perspective and/or environmental perspective. In this manner, the at least one collaborative agreement may be automatically altered and/or restructured, via the present disclosure, in real-time, such that the at least one collaborative agreement is configured to be the most flexible, cost-effective, environmentally friendly, and/or efficient agreement between the at least one shipping vessel, alternative shipping vessel, the terminal operator and/or at least one alternative party. The system and method will be described in greater detail in the sections herein below.

Figure 3:
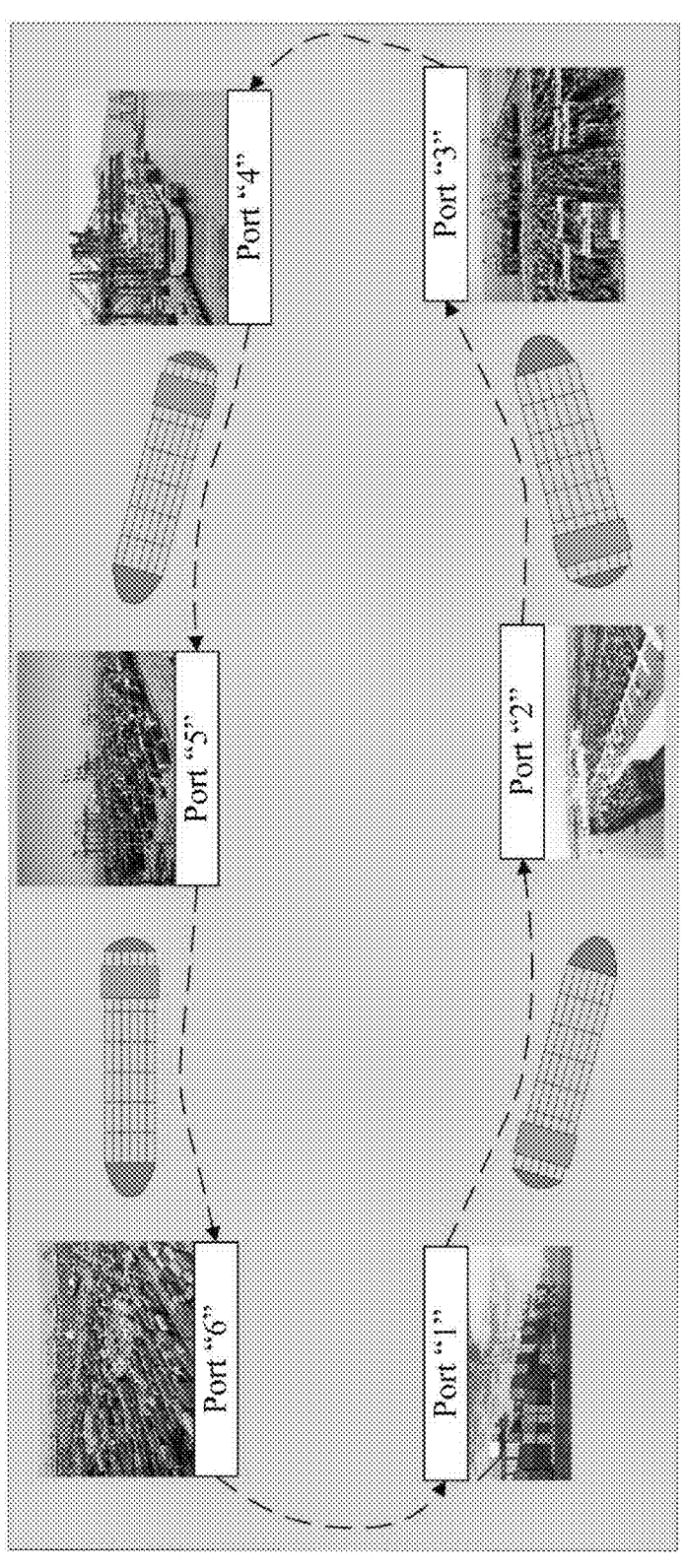
FIG. 3 is a schematic illustration of a shipping route, according to an embodiment of the present disclosure.

As stated above, an aspect of the present disclosure is that the present disclosure comprises a shipping schedule operating system configured to implement at least one standard contract component and/or objective preference, via a computing device. In an embodiment, the shipping schedule operating system may automatically select at least one metric of the at least one shipping vessel, alternative shipping vessel, terminal operator, and/or shipping route. Accordingly, the shipping schedule operating system may be configured to implement at least one mathematical model, such that at least one comprehensive collaborative agreement amongst at least one shipping vessel, alternative shipping vessel, and/or terminal operator may be captured by the shipping schedule operating system. As shown in FIG. 3, in an embodiment, for the at least one collaborative agreement, the shipping schedule operating system may be configured to not only automatically select and/or implement at least one terminal at each port of the at least one shipping route, but also may be configured to automatically request at least one appropriate arrival time window and at least one handling rate.

As such, in an embodiment, $M_p = \{1, \ldots, b_p\}$, $p \in P$ may represent at least one intake station (hereinafter "terminal operator") available at each port p of the at least one shipping route, which have at least one collaborative agreement in place and/or may be able to share the available capacity (e.g., berthing space, arrival time windows, and/or designated handling equipment) for service of the arriving at least one shipping vessel and/or alternative shipping vessel. A set of arrival time windows available at station m of port p may be represented as $T_{pm} = \{1, \ldots, c_{pm}\}$, $p \in P$, $m \in M_p$. Additionally, in this embodiment, in order to allow flexibility of the at least one schedule of the at least one shipping vessel, alternative shipping vessel, and/or terminal operator, the shipping schedule operating system may be configured to adopt at least one soft time window. In particular, the at least one shipping vessel and/or alternative shipping vessel may not be restricted to arrive within the selected time window and may be able to arrive before the time window start and after the time window end. When the at least one shipping vessel and/or alternative shipping vessel arrives before the time window start, the at least one shipping vessel and/or alternative shipping vessel may be required to wait for service, as the at least one type of available designated handling equipment may be reserved for service of other shipping vessels.

However, in an embodiment, when the soft time window is implemented by the shipping schedule operating system, the shipping schedule operating system may be configured to assume that the service of the at least one shipping vessel and/or alternative shipping vessel may start upon the arrival of the at least one shipping vessel and/or alternative shipping vessel even if the at least one shipping vessel and/or alternative shipping vessel may have arrived after the time window end. As such, the shipping schedule operating system may be configured to automatically calculate and/or automatically implement, in-real time, at least one additional cost which may be incurred by the at least one shipping vessel and/or alternative shipping vessel within the at least one collaborative agreement in order to compensate the at least one terminal operator of the selected port for the utilization of limited designated handling equipment after the agreed arrival time window, as defined in the at least one original collaborative shipping agreement between the at least one shipping vessel, alternative shipping vessel, and/or terminal operator.

Furthermore, depending on the designated handling equipment available during time window t, each terminal operator m of the at least one port p may be configured to provide a at least one handling rate, $H_{pmt}=\{1, \ldots, d_{pmt}\}$, $p \in P$, $m \in M_p$, $t \in T_{pm}$. Accordingly, in an embodiment, the shipping schedule operating system may be configured to integrate each handling rate provided by the at least one terminal operator of the at least one port. In this manner, each handling rate may have a specific handling productivity $\pi_{pmth}$, $p \in P$, $m \in M_p$, $t \in T_{pm}$, $h \in H_{pmt}$ that may essentially define the total number of TEUs that may be handled at terminal operator m of the at least one port p during time window t (hours). Additionally, in an embodiment, index "p" may be used in $\pi_{pmth}$ to capture at least one variability of at least one container handling resource amongst each port of the at least one shipping route, whereas index "m" may be configured to account for the operational feature that even collaborating terminal operators at each port of the at least one shipping route may have different resources for service of the at least one arriving shipping vessel and/or alternative shipping vessel. Furthermore, in this embodiment, index "t" may be used to model variations of the available capacity (e.g., berthing space) by time of day, as less arrival time windows will be available during peak hours compared to off-peak hours. In the meantime, index "h" may capture at least one handling rate that may be provided by collaborating terminal operators of each port of the at least one shipping route during the available time windows. Considering the aforementioned operational features, the at least one handling time of the at least one shipping vessel and/or alternative shipping vessel at the at least one port p ($\tau_p^{hand}$, $p \in P$—hours) of the at least one shipping route may be computed using the following equation:

$$\tau_p^{hand} = \sum_{m \in M_p} \sum_{t \in T_{pm}} \sum_{h \in H_{pmt}} \left(\frac{\phi_p^{port}}{\pi_{pmth}}\right) z_{pmth} \ \forall \ p \in P \quad (3\text{-}1)$$

In the above equation, $z_{pmth}$, $p \in P$, $m \in M_p$, $t \in T_{pm}$, $h \in H_{pmt}$ may equate to one (1) if the at least one handling rate h will be used for the service of the at least one shipping vessel and/or alternative shipping vessel at the at least one terminal operator m of the at least one port p during time window t (else=0); $\phi_p^{port}$, $p \in P$ represents a total number of containers (e.g., a payload of the at least one shipping vessel and/or alternative shipping vessel) that may be handled at the at least one port p (TEUs) of the at least one shipping route.

Figure 2:
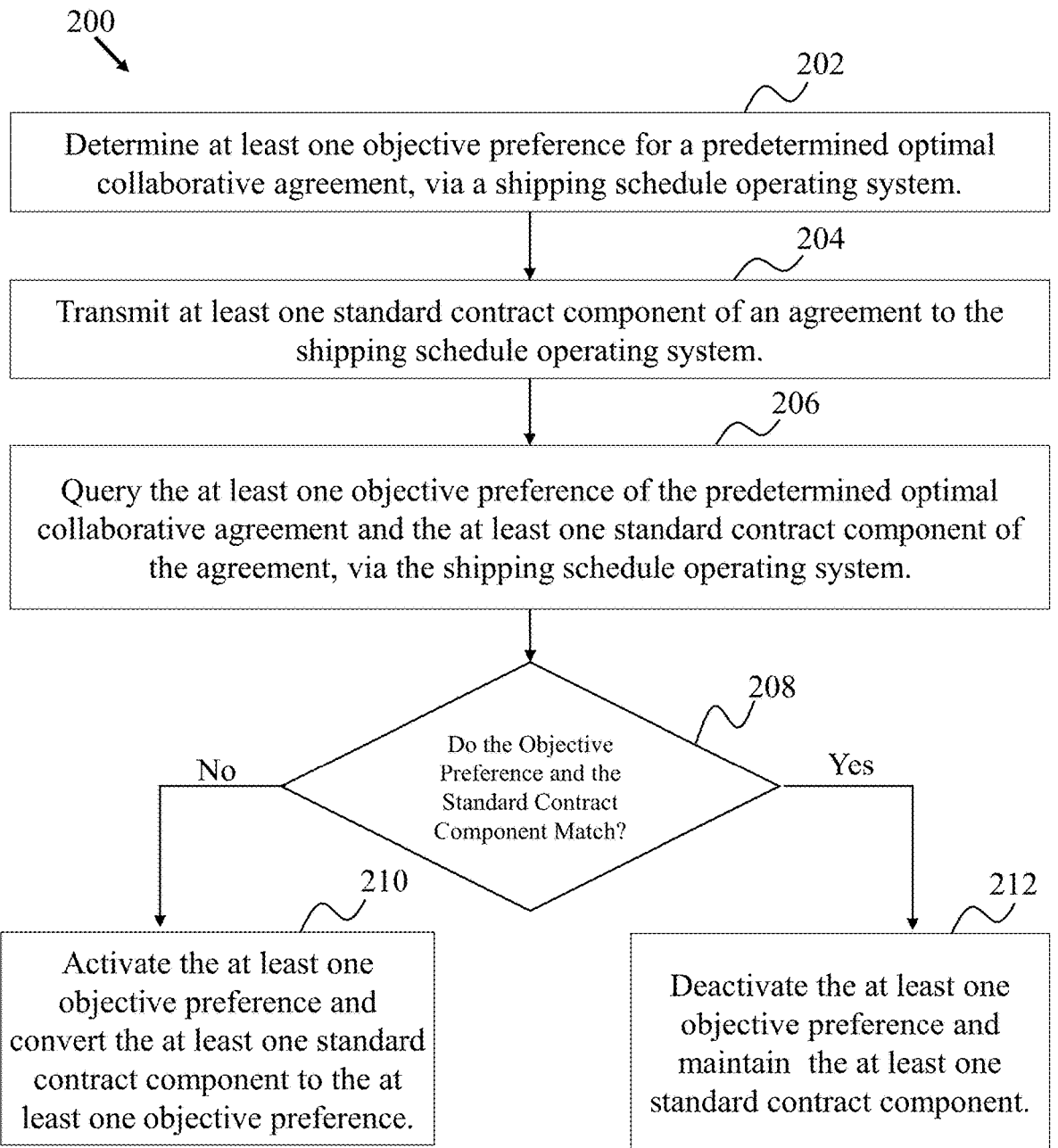
FIG. 2 is an exemplary process flow diagram depicting a method of automatically facilitating a comprehensive collaborative agreement, according to an embodiment of the present disclosure.

FIG. 2 depicts an exemplary process flow diagram depicting a method 200 of automatically modifying a comprehensive collaborative agreement via shipping schedule operating system of a computing device, according to an embodiment of the present disclosure. The steps delineated in FIG. 2 are merely exemplary of an order of modifying the collaborative agreement. The steps may be carried out in another order, with or without additional steps included therein.

In this manner, in an embodiment, the at least one shipping vessel may require service for each of the at least one shipping route, which may be comprised of a predetermined amount of ports and/or terminal operators. For example, as shown in FIG. 3, in an embodiment, the at least one vessel may serve a shipping route comprising at least one station (e.g., terminal operator) of at least one port.

As shown in FIG. 2, method 200 begins at step 202, in which an objective preference is determined for the shipping schedule operating system via a computing device. In an embodiment, this step includes a processor of the computing device receiving at least one objective preference, such as from a user and/or the shipping schedule operating system of the computing device. The objective preference may then be stored within a memory of the shipping schedule operating system, such that the shipping schedule operating system may then access the memory prior to finalizing the at least one objective associated with the collaborative agreement on the computing device. In some embodiments, the memory may be configured to be integrated within the shipping schedule operating system of the computing device. In some embodiments, the memory may comprise an outside database, such that the shipping schedule operating system of the computing device may be configured to communicate with the third-party database to obtain at least one data set from the outside database.

Accordingly, in an embodiment, the at least one objective preference may be predetermined by the following including but not limited to, the shipping schedule operating system, the user, the at least one shipping vessel, and/or the terminal operators. In this manner, the shipping schedule operating system may be configured to intake at least one of the following, including but not limited to, the fuel consumption of at least one shipping vessel, a port service frequency for the at least one shipping vessel, a payload for the at least one shipping vessel, a pollutant emission of the at least one shipping vessel, and/or any metric known in the art which may be used to define an efficiency rate of the at least one shipping vessel.

Moreover, in an embodiment, another aspect of the present disclosure is that the shipping schedule operating system may be configured to model at least one of the following, including but not limited to fuel consumption of the at least one shipping vessel, the port service frequency of the at least one shipping vessel, the payload for the at least one shipping vessel, and/or the pollutant emission of the at least one shipping vessel. For example, an accurate fuel consumption modeling is essential for real-time ship schedule design. As such, in this example, the fuel consumption cost may comprise a substantial portion of the service cost of the at least one shipping route, such that it may be factored into a collaborative agreement between at least one shipping vessel and at least one terminal operator.

Additionally, in an embodiment, another feature which may be incorporated into the at least one fuel consumption model, when the shipping scheduling operating system determined an objective presence is at least one different operational factor and/or at least one physical factor, may include but is not limited to an age of the at least one shipping vessel, a speed of the at least one shipping vessel, a geometry of the of the at least one shipping vessel, a propeller design of the at least one shipping vessel, previous maintenance activities that may be required for the at least one shipping vessel, at least one previous repair required by the at least one shipping vessel, the payload of the at least one shipping vessel, and/or any weather conditions which the at least one shipping vessel may face through at least one portion of the at least one shipping route. As such, in an embodiment, the shipping schedule operating system may be configured to adjust the fuel consumption model based on the speed of the at least one shipping vessel, as speed has been viewed as the most influential predictor for the ship fuel consumption (Wang and Meng, 2012; Pasha et al., 2021). Therefore, the fuel consumption through at least one portion of the at least one shipping route of at least one main engine of the at least one shipping vessel may be evaluated using the following equation, where the at least one portion of the at least one shipping route is defined as p ($\phi_p^{design}$, p∈P—tons/nmi):

$$\varphi_p^{design} = \frac{\gamma(s_p)^{\alpha-1}}{24} \ \forall \ p \in P \qquad (3\text{-}2)$$

In the above equation, $s_p$, p∈P represents the speed to be set at the at least one portion of the at least one shipping route p (knots); $\alpha$, $\gamma$ represent the coefficients for the fuel consumption function of the at least one main engine of the at least one shipping vessel.

Figures 4A, 4B:
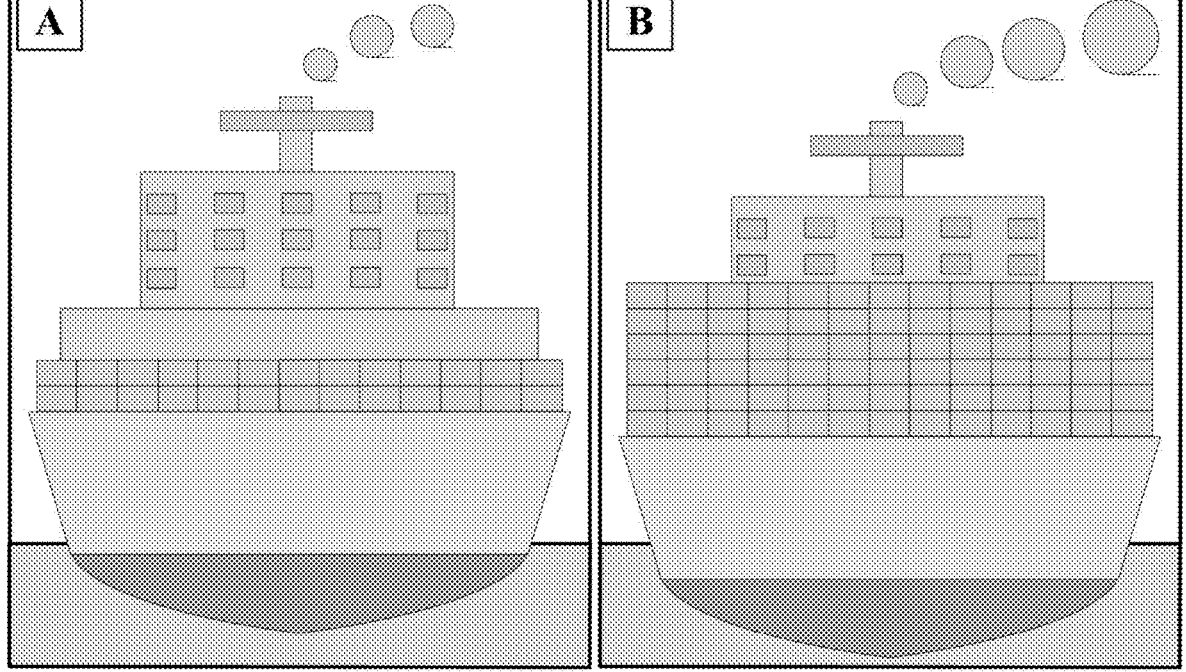
FIGS. 4A-4B are a schematic illustration of a ship sailing, according to an embodiment of the present disclosure.

Accordingly, in an embodiment, as shown in FIGS. 4A-4B, the fuel consumption model of the shipping schedule operating system, may also be configured to incorporate the payload of the at least one shipping vessel within the fuel consumption model. Therefore, a full payload, as shown in FIG. 4B, of the at least one shipping vessel may consume more fuel, in contrast to a partially-laden payload, as shown in FIG. 4A, of the at least one shipping vessel, especially at higher sailing speeds, which further increases the quantity of emissions released by the main ship engines. As such, in order to capture the effects of the payload of the at least one shipping vessel, the shipping schedule operating system may be configured to use the following equation for incorporating and/or calculating the fuel consumption of the at least one engine of the at least one shipping vessel through the at least one portion of the at least one shipping route, where the at least one portion of the at least one shipping route is defined as p ($\varphi_p$, p∈P—tons/nmi) (Kontovas, 2014; Adland and Jia, 2016; Pasha et al., 2021):

$$\varphi_p \varphi_p^{design} \cdot \left( \frac{\phi_p^{sea} \cdot \varpi + \psi^{empty}}{\psi^{cap} + \psi^{empty}} \right)^{\frac{2}{3}} = \frac{\gamma(s_p)^{\alpha-1}}{24} \cdot \left( \frac{\phi_p^{sea} \cdot \varpi + \psi^{empty}}{\psi^{cap} + \psi^{empty}} \right)^{\frac{2}{3}} \qquad (3\text{-}3)$$

$$\forall \ p \in P$$

In the above equation, $\phi_p^{sea}$, p∈P represents at least one container of the payload which may be configured to be carried by the at least one shipping vessel through the at least one portion of the at least one shipping route p (TEUs); $\varpi$ represents an average cargo weight inside the at least one container (e.g., tons); $\psi^{empty}$ represents an empty weight of the at least one shipping vessel to be deployed (e.g., tons); $\psi^{cap}$ represents a total capacity of the at least one shipping vessel to be deployed (e.g., tons).

Furthermore, in an embodiment, the shipping schedule operating system may be configured to detect at least one sailing speed lower bound ($s^{min}$, knots) and at least one sailing speed upper bound ($s^{max}$, knots). When selecting the at least one sailing speed through at least one portion of the at least one shipping route, the at least one sailing speed may comprise a range of at least the at least one sailing speed lower bound to at most the at least one sailing speed upper bound, encompassing every integer in between. Accordingly, when the shipping schedule operating system selects the at least one sailing speed of the at least one shipping vessel, the shipping schedule operating system may be configured to calculate and/or project the fuel consumption model. As such, in an embodiment, the at least one lower and/or upper sailing speed bound may be determined based on at least one practical consideration, including but not limited to a capacity of the at least one engine of the at least one shipping vessel and/or a wear of the at least one engine of the at least one shipping vessel at a high speed, as defined by an industry standard, a capacity of the at least one engine of the at least one shipping vessel and/or a wear of the at least one engine of the at least one shipping vessel at an average speed, as defined by the industry standard known in the art, and/or a capacity of the at least one engine of the at least one shipping vessel and/or a wear of the at least one engine of the at least one shipping vessel at a low speed, as defined by the industry standard known in the art) (Psaraftis and Kontovas, 2013; Wang et al., 2013). In an embodiment, the shipping schedule operating system may be configured to model the fuel consumption of the at least one shipping vessel based on the at least one engine of the at least one shipping vessel and/or the at least one alternative shipping vessel, alone, as the fuel consumption by at least one alternative engine of the at least one shipping vessel may not substantially alter the fuel consumption of the at least one shipping vessel through at least one portion of the at least one shipping route (Pasha et al., 2021). In some embodiments, the shipping schedule operating system may be configured to model the fuel consumption of the at least one shipping vessel and/or the at least one alternative shipping vessel, based on the at least one engine, the payload, and/or any factor known in the art which may be used to calculate a fuel consumption. In this manner, the shipping schedule operating system may be configured to account for the fuel consumption of the at least one alterative engine of the at least one shipping vessel and/or at least one alternative shipping vessel in the fuel consumption model, an operational cost, a chartering cost, and/or any model known in the art which may account for fuel consumption of at least one alternative engine of the at least one shipping vessel and/or the at least one alternative shipping vessel.

As stated above, the shipping schedule operating system may be configured to incorporate the port service frequency of the at least one shipping vessel as an objective preference in method 200, as shown in FIG. 2. In an embodiment, at least one shipping vessel may be required to serve each port of the at least one shipping route at a predetermined frequency (e.g., daily, weekly, bi-weekly, and/or any frequency known in the art for servicing ports). Accordingly, the at least one shipping vessel may be configured to serve every port on a weekly basis. As such, in some embodiments, the at least one shipping vessel may be configured to serve every port daily or bi-weekly, and/or any frequency known in the art which at least one shipping vessel may service at least one port of at least one shipping route. In an embodiment, the shipping schedule operating system may comprise an equation configured to capture any service frequency known in the art of the at least one shipping vessel to the at least one port of the at least one shipping route. As such, the following relationship, as defined in the equation below, may be required to be maintained by the at least one shipping vessel to ensure that each port of the at least one shipping route may be served on a weekly basis (Alharbi et al., 2015; Pasha et al., 2021):

$$168q = \sum_{p \in P} \tau_p^{sail} + \sum_{p \in P} \tau_p^{hand} + \sum_{p \in P} \tau_p^{wait} \qquad (3\text{-}4)$$

In the above equation, "168" represents a number of hours in a one-week time interval; $\tau_p^{sail}$, $p \in P$ represents a shipping time of the at least one shipping vessel along at least one portion of the at least one shipping route p (hours); $\tau_p^{wait}$, $p \in P$ represents a waiting time of the at least one shipping vessel at the at least one port of the at least one shipping route p (hours).

Additionally, in an embodiment, as shown in the equation above, the left-hand side of equation (3-4) represents a product of "168" (e.g., number of hours in a one-week time interval) and the total number of shipping vessels to be deployed for a given shipping route. In some embodiments, the product may comprise any value known in the art which may be used to define a shipping frequency, in a predetermined amount of travel time for the at least one shipping vessel on the at least one shipping route. Moreover, the right-hand side of equation (3-4) may comprise a turnaround time for the at least one shipping vessel. As used herein, the term "turnaround time" may refer to any time known in the art that is required for at least one shipping vessel to visit each port of the at least one shipping route and return to a port of origin after the at least one shipping vessel completes the at least one shipping route. The turnaround time may be measured in hours, days, and/or weeks. For ease of reference, the exemplary embodiment described herein refers to weeks, but this description should not be interpreted as limiting to other times.

As such, in an embodiment, when modeling the objective preference, the shipping schedule operating system may be configured to factor the following into the turnaround time of the at least one shipping vessel, including but not limited to the travel time of the at least one shipping vessel along at least one portion of the at least one shipping route, a handling time of the at least one shipping vessel at the at least one port, and a waiting time of the at least one shipping vessel at the at least one port. Accordingly, the turnaround time may be configured to be reduced by the shipping schedule operating system by increasing at least the speed of the at least one shipping vessel, such that the travel time of the at least one shipping vessel may be decreased along at least one portion of the at least one shipping route. Additionally, the shipping schedule operating system may be configured to communicate, via any manner known in the art, with the at least one terminal operator, such that at least one handling rate with a higher handling productivity may be requested by the at least one shipping vessel, such that the handling time of the at least one shipping vessel may be substantially decreased at the at least one port of the at least one shipping route. However, in some embodiments, requesting at least one handling rate with a higher handling productivity and/or increasing at least the speed of the at least one shipping vessel may increase the fuel consumption, a fuel cost, and/or a service cost of the at least one shipping vessel at the at least one port of the at least one shipping route. Nevertheless, the turnaround time increase of the at least one shipping vessel may be less favorable based on the operating cost of the at least one shipping vessel, as the at least one shipping vessel may have to be assigned for service of the at least one shipping route in order to maintain the weekly service frequency at the at least one port of the at least one shipping route.

Furthermore, in an embodiment, the shipping schedule operating system of the present disclosure may be configured to account for a total number of shipping vessels available for service of the at least one shipping route. Accordingly, in case the total number of own shipping vessels available ($q^{own\text{-}max}$—e.g., cargo ship) may not be sufficient for service of the at least one shipping route, the shipping schedule operating system of the at least one shipping vessel may be configured to communicate to the at least one alternative shipping vessel and/or at least one terminal operator of the at least one port, via any manner known in the art, such that the shipping schedule operating system may charter the at least one alternative shipping vessel to assist with the at least one shipping route. In addition, the total number of alternative shipping vessel available for chartering may be denoted as $q^{char\text{-}max}$ (e.g., cargo ship). As such, in an embodiment, the shipping schedule operating system may outline the relationship between the at least one shipping vessel and the at least one alternative (e.g., chartered shipping vessel) shipping vessel which may be considered by the shipping schedule operating system for the at least one shipping vessel deployed ($q^{own}$—at least one own shipping vessel) and for the at least one alternative shipping vessel deployed ($q^{char}$—at least one alternative shipping vessel):

$$q = q^{own} + q^{char} \qquad (3\text{-}5)$$

$$q^{gown} \leq q^{own\text{-}max} \qquad (3\text{-}6)$$

$$q^{char} \leq q^{char\text{-}max} \qquad (3\text{-}7)$$

In this manner, a cost of employing the at least one alternative shipping vessel may be higher than the cost of only operating the at least one own shipping vessel. As such, in an embodiment, the shipping schedule operating system based on the equations shown above, may be configured to calculate the additional increase in the service cost of the at least one shipping route. Additionally, in case the total cost of ship charting becomes substantial, the shipping schedule operating system may determine to increase the speed of the at least one shipping vessel, such that the at least one shipping vessel may maintain the service frequency of the at least one shipping route without requiring at least one alternative shipping vessel to maintain the service frequency of the at least one shipping route.

Moreover, as stated above, in an embodiment, the shipping schedule operating system may be configured to also incorporate the payload of the at least one shipping vessel through the at least one portion of the at least one shipping route as an objective preference in method 200, as shown in FIG. 2. In this manner, it is well known in the art, that traveling at a low speed (hereinafter "slow steaming") (e.g., sailing at a low speed) may be used to reduce the fuel consumption and the fuel cost of the at least one shipping vessel, along with the total quantity of emissions released (De et al., 2016; Wen et al., 2017; Mallidis et al., 2018). However, slow steaming may comprise disadvantages as well, as a reduction in the speed of the at least one shipping vessel may lead to an increase in the shipping time and/or a total time the payload may spend on board the at least one shipping vessel. As such, an excessive amount of time that the payload spends on at least one shipping vessel may negatively affect the shipping efficiency of the at least one shipping vessel and may not viewed as desirable by customers and/or existing clients. Therefore, in an embodiment, the shipping schedule operating system may be configured to incorporate the cost of the payload of the at least one shipping vessel when calculating and/or modeling the objective preference for at least one shipping agreement. Accordingly, the shipping schedule operating system may be configured to use the following equation, where the cost of the payload ($\Lambda^{inv}$—USD) may be computed based on a unit cost of the payload ($\delta^{inv}$—USD per TEU per hour), a total number of containers (e.g., the total payload) that may be carried by the at least one shipping vessel through the at least one portion of the at least one shipping route p ($\phi_p^{sea}$, p∈P—TEUs), and the shipping time of the at least one shipping vessel through the at least one portion of the at least one shipping route ($\tau_p^{sail}$, p∈P—hours) (Wang et al., 2014; Pasha et al., 2021):

$$\Lambda^{inv} = \delta^{inv} \sum_{p \in P} \phi_p^{sea} \tau_p^{sail} \qquad (3\text{-}8)$$

Finally, as stated above, in an embodiment, the shipping schedule operating system may be configured to also incorporate the emission release of the at least one shipping vessel through the at least one portion of the at least one shipping route as an objective preference in method 200, as shown in FIG. 2. As indicated in the Background Section above, the IMO continues imposing more and more restrictions on shipping vessels to reduce the quantity of emissions released. Accordingly, in order to meet the IMO environmental targets, the shipping schedule operating system may be configured to account for the amount of emissions produced by the at least one shipping vessel when transporting the payload along at least one portion of the at least one shipping route, such that the shipping schedule operating system may use emission release as an objective preference when determining and/or projecting the at least one shipping agreement. In an embodiment, the shipping schedule operating system may conform to the IMO standard and may be configured to classify emission as the following, including but not limited to greenhouse gas emissions and/or other relevant substances. Furthermore, the greenhouse gas emissions may comprise the following, including but not limited to carbon dioxide—$CO_2$, methane—$CH_4$, and/or nitrous oxide—$N_2$. In this manner, the other relevant substances may comprise the following, including but not limited to nitrogen oxides—$NO_x$, sulphur oxides—$SO_x$, carbon monoxide—CO, non-methane volatile organic compounds—VOC, particulate matter—PM, and/or black carbon—BC. As known in the art, one of the more common methods known in the art used for estimating emissions produced by shipping vessels may be based on at least the emission factors. (Psaraftis and Kontovas, 2013; Kontovas, 2014). Accordingly, in an embodiment, the shipping schedule operating system may be configured to comprise the emissions factor equation, known in the art, shown below. Therefore, each emission release may include at least one emission factor, such that a total emission release may be measured based on the fuel consumption of the at least one shipping vessel. In this manner, the total emission release which may be produced by at least one shipping vessel through the at least one portion of the at least one shipping route p ($\xi_p^{sea}$, p∈P—e.g., tons) may be computed using the following equation:

$$\tau_p^{sea} = \eta^{sea} \lambda_p \varphi_p, \forall p \in P \qquad (3\text{-}9)$$

In the above equation, $\eta^{sea}$ represents the at least one emission factor for the emission release (e.g., tons of emissions/ton of fuel) through the at least one portion of the at least one shipping route; $\lambda_p$ represents a total length of the at least one shipping route p (e.g., nmi).

In addition, in an embodiment, the shipping scheduling operating system may be configured to vary the at least one emission factor ($\eta^{sea}$) for different emission releases. For example, the emission factor for $CO_2$ may comprise 3.144 tons of $CO_2$ emissions/ton of fuel, whereas the emission factor for $NO_x$ may comprise 78.61 kg of $NO_x$ emissions/ton of fuel (Kontovas, 2014; IMO, 2020). Furthermore, in an embodiment, the total emission release at the at least one port of the at least one shipping route by at least one handling equipment type may also be accounted for by the shipping schedule operating system. Accordingly, the total amount of emission release that may be produced by the at least one handling equipment type at the at least one port p ($\xi_p^{port}$, p∈P—tons) may be computed based on the at least one emission factor, using the following equation (Tran et al., 2017):

$$\xi_p^{port} = \phi_p^{port} \sum_{m \in M_p} \sum_{t \in T_{pm}} \sum_{h \in H_{pmt}} \eta_{pmth}^{port} z_{pmth} \quad \forall \, p \in P \qquad (3\text{-}10)$$

The equation, as seen above, comprises $\eta_{pmth}^{port}$ which represents the at least one emission factor for servicing the at least one shipping vessel at the at least one port under the at least one handling rate h at terminal operator m of port p during time window t (tons of emissions/TEU). As such, the total emission release produced by the at least one handling equipment type may not be affected just by the at least one handling rate requested by the shipping schedule operating system, but also by the at least one handling equipment type deployed by each of the at least one terminal operator during a predetermined time window (e.g., during a peak-hour period, each of the at least one terminal operator may have only certain types of container handling equipment available). Therefore, the term "$\eta_{pmth}^{port}$" may include but are not limited to indexes "p", "m", "h", and/or "t."

TABLE 1

| | |
|---|---|
| $P = \{1, \ldots, a\}$ | set of ports for a given shipping route |
| $M_p = \{1, \ldots, b_p\}$, p ∈ P | set of terminals available at port p |
| $T_{pm} = \{1, \ldots, c_{pm}\}$, | set of ship arrival time windows available |
| p ∈ P, m ∈ $M_p$ | at terminal m of port p |
| $H_{pmt} = \{1, \ldots, d_{pmt}\}$, p ∈ P, | set of handling rates available at terminal |
| m ∈ $M_p$, t ∈ $T_{pm}$ | m of port p during time window t |

TABLE 2

| | |
|---|---|
| $s_p \in \mathbb{R}^+ \; \forall p \in P$ | speed of at least one shipping vessel to be set at least one portion of at least one shipping route p (knots) |
| $x_{pm} \in \mathbb{B} \; \forall p \in P, m \in M_p$ | =1 if terminal m will be used for the service of at least one shipping vessel at port p (else = 0) |
| $y_{pmt} \in \mathbb{B} \; \forall p \in P, m \in M_p,$ $t \in T_{pm}$ | =1 if time window t will be used for the service of at least one shipping vessel at terminal m of port p (else = 0) |
| $z_{pmth} \in \mathbb{B} \; \forall p \in P, m \in M_p,$ $t \in T_{pm}, h \in H_{pmt}$ | =1 if at least one handling rate h will be used for the service of at least one shipping vessel at terminal m of port p during time window t (else = 0) |

TABLE 3

| | |
|---|---|
| $q \in \mathbb{N}$ | total number of shipping vessels for deployment |
| $q^{own} \in \mathbb{N}$ | total number of own shipping vessels for deployment |
| $q^{char} \in \mathbb{N}$ | total number of alternative (e.g., chartered) shipping vessels for deployment |
| $\tau_p^{arr} \in \mathbb{R}^+ \; \forall p \in P$ | arrival time of a shipping vessel at port p (hours) |
| $\tau_p^{wait} \in \mathbb{R}^+ \; \forall p \in P$ | waiting time of a shipping vessel at port p (hours) |
| $\tau_p^{hand} \in \mathbb{R}^+ \; \forall p \in P$ | handling time of a shipping vessel at port p (hours) |
| $\tau_p^{dep} \in \mathbb{R}^+ \; \forall p \in P$ | departure time of a shipping vessel from port p (hours) |
| $\tau_p^{sail} \in \mathbb{R}^+ \; \forall p \in P$ | shipping time of a shipping vessel at voyage leg p (hours) |
| $\varphi_p \in \mathbb{R}^+ \; \forall p \in P$ | fuel consumption of a shipping vessel at voyage leg p (tons/nmi) |
| $\tau_p^{late} \in \mathbb{R}^+ \; \forall p \in P$ | late arrival of a shipping vessel at port p (hours) |
| $\xi_p^{sea} \in \mathbb{R}^+ \; \forall p \in P$ | total amount of emission release that will be produced along at least one portion of the at least one shipping route p (tons) |
| $\xi_p^{port} \in \mathbb{R}^+ \; \forall p \in P$ | total amount of emission release that will be produced at port p (tons) |
| $\Lambda^{own} \in \mathbb{R}^+$ | total operational cost of own shipping vessels (USD) |
| $\Lambda^{char} \in \mathbb{R}^+$ | total cost of alternative (e.g., chartered) shipping vessels (USD) |
| $\Lambda^{inv} \in \mathbb{R}^+$ | total cost of payload (USD) |
| $\Lambda^{late} \in \mathbb{R}^+$ | total cost of shipping vessel late arrival at ports (USD) |
| $\Lambda^{fuel} \in \mathbb{R}^+$ | total cost of shipping vessel fuel (USD) |
| $\Lambda^{port} \in \mathbb{R}^+$ | total cost of service of shipping vessels at ports (USD) |
| $\Lambda^{emis} \in \mathbb{R}^+$ | total cost of emission release of shipping vessels (USD) |

TABLE 4

| | |
|---|---|
| $a \in \mathbb{N}$ | total number of ports under a given port rotation (ports) |
| $b_p \in \mathbb{N} \; \forall p \in P$ | total number of terminals available at port p (ports) |
| $c_{pm} \in \mathbb{N} \; \forall p \in P, m \in M_p$ | total number of shipping vessel arrival time windows available at terminal m of port p (time windows) |
| $d_{pmt} \in \mathbb{N} \; \forall p \in P, m \in M_p,$ $t \in T_{pm}$ | total number of handling rates available at terminal m of port p during time window t (rates) |
| $a, \gamma \in \mathbb{R}^+$ | coefficients for the at least one shipping vessel fuel consumption |
| $\overline{\omega} \in \mathbb{R}^+$ | average payload weight inside a standard 20-ft container (tons) |
| $\psi^{empty} \in \mathbb{R}^+$ | empty weight of the at least one shipping vessel to be deployed (tons) |
| $\psi^{cap} \in \mathbb{R}^+$ | total capacity of the at least one shipping vessel to be deployed (tons) |
| $\eta^{sea} \in \mathbb{R}^+$ | emission factor at sea (tons of emissions/ton of fuel) |
| $\eta_{pmth}^{port} \in \mathbb{R}^+ \; \forall p \in P,$ $m \in M_p, t \in T_{pm}, h \in H_{pmt}$ | emission factor for the service of the at least one shipping vessel under handling rate h at terminal m of port p during time window t (tons of emissions/TEU) |
| $\pi_{pmth} \in \mathbb{R}^+ \; \forall p \in P,$ $m \in M_p, t \in T_{pm}, h \in H_{pmt}$ | handling productivity for handling rate h that will be used for the service of the at least one shipping vessel at terminal m of port p during time window t (TEUs/hour) |
| $\delta^{own} \in \mathbb{R}^+$ | weekly operational cost of the at least one own shipping vessel (USD/week) |
| $\delta^{char} \in \mathbb{R}^+$ | weekly cost of the at least one alternative (e.g., chartered) shipping vessel (USD/week) |
| $\delta^{inv} \in \mathbb{R}^+$ | unit cost of payload (USD$\delta$ per TEU per hour) |
| $\delta_p^{late} \in \mathbb{R}^+ \; \forall p \in P$ | unit cost of late arrival of the at least one shipping vessel at port p (USD/hour) |
| $\delta_p^{fuel} \in \mathbb{R}^+$ | unit cost of the at least one shipping vessel fuel through at least one portion of the at least one shipping route p (USD/ton) |

TABLE 4-continued

| | |
|---|---|
| $\delta_{pmth}{}^{hand} \in \mathbb{R}^+ \; \forall p \in P,$ $m \in M_p, t \in T_{pm}, h \in H_{pmt}$ | unit cost of service of the at least one shipping vessel under handling rate h at terminal m of port p during time window t (USD/TEU) |
| $\delta^{emis} \in \mathbb{R}^+$ | unit cost of the at least one shipping vessel emissions (USD/ton) |
| $\lambda_p \in \mathbb{R}^+ \; \forall p \in P$ | length of at least one portion (or voyage leg) of at least one shipping route p (nmi) |
| $\phi_p{}^{sea} \in \mathbb{N} \; \forall p \in P$ | total number of containers that will be carried through at least one portion of at least one shipping route leg p (TEUs) |
| $\phi_p{}^{port} \in \mathbb{N} \; \forall p \in P$ | total number of containers that will be handled at port p (TEUs) |
| $s^{min} \in \mathbb{R}^+$ | lower bound on the at least one shipping vessel sailing speed (knots) |
| $s^{max} \in \mathbb{R}^+$ | upper bound on at least one shipping vessel sailing speed (knots) |
| $q^{own\text{-}max} \in \mathbb{N}$ | available number of own shipping vessels for deployment |
| $q^{char\text{-}max} \in \mathbb{N}$ | available number of alternative (e.g., chartered) shipping vessels for deployment |
| $\tau_{pmt}{}^{st} \in \mathbb{R}^+ \; \forall p \in P,$ $m \in M_p, t \in T_{pm}$ | start time for time window t at terminal m of port p (hours) |
| $\tau_{pmt}{}^{end} \in \mathbb{R}^+ \; \forall p \in P,$ $m \in M_p, t \in T_{pm}$ | end time for time window t at terminal m of port p (hours) |

In an embodiment, the shipping schedule operating system may comprise at least one bi-objective mixed-integer programming model (hereinafter "SSP-CAT"), such that at least one collaborative agreement between at least one shipping vessel and at least one terminal operator amongst the shipping line and terminal operators may be formulated. In this manner, a first objective preference ($F_1$) may be configured to minimize at least one cost component, which may be comprised of at least one economic perspective, including but not limited to, (i) the total operational cost of the at least one shipping vessel, (ii) the total cost of the at least one alternative shipping vessel, (iii) the total cost of the payload of the at least one shipping vessel and/or the at least one alternative shipping vessel, and/or (iv) a total cost of late arrival by the at least one shipping vessel and/or the at least one alternative shipping vessel at the at least one port. Additionally, in an embodiment, a second objective preference ($F_2$) may be configured to minimize at least one cost component which may be comprised of at least one environmental perspective and/or at least one economic perspective. In some embodiments, the cost component of the second objective preference may comprise only the at least one economic perspective or environmental perspective. As such, the at least one economic perspective may be comprised of the following, including but not limited to, (i) the total cost of the fuel for the at least one shipping vessel and/or the at least one alternative shipping vessel, (ii) the total cost of service for the at least one shipping vessel and/or the at least one alternative shipping vessel at the at least one port, and/or (iii) the total cost of emission release by the at least one shipping vessel and/or the at least one alternative shipping vessel.

$$\min F_1 = [\Lambda^{own} + \Lambda^{char} + \Lambda^{inv} + \Lambda^{late}] \qquad (4\text{-}1)$$

$$\min F_2 = [\Lambda^{fuel} + \Lambda^{port} + \Lambda^{emis}] \qquad (4\text{-}2)$$

Indeed, the first objective preference $F_1$ and the second objective preference $F_2$ may be conflicting in nature. For example, if the at least one shipping vessel was configured to strictly pursue the environmental sustainability goals, the at least one engine of the at least one shipping vessel may be set to the lowest speed available for the at least one shipping vessel, such that the fuel consumption of the at least one shipping vessel may be reduced and/or the associated emission release produced by at least one shipping vessel may also be reduced. Furthermore, in this example, the at least one shipping vessel may also select at least one the lowest possible handing rate at the at least one port of the at least one shipping route, such that the associated emission release produced by the at least one designated handling equipment type throughout the service of the at least one shipping vessel may be substantially reduced.

Accordingly, the aforementioned actions required to reduce the $F_2$ objective preference, however, may decrease the speed of the at least one shipping vessel and/or the at least one alternative shipping vessel and/or the at least one handing rate at the at least one port may also increase the total amount of time spent on the at least one shipping route and/or the at least one port, respectively. Therefore, the turnaround time of the at least one shipping vessel may increase, which may necessitate the deployment of at least one additional shipping vessel, such that the at least one shipping vessel may ensure that the service frequency of the at least one port may be maintained. As such in an embodiment, the shipping schedule operating system may be configured to communicate, via any manner known in the art, with the at least one terminal operator and/or alternative shipping vessel, such that the turnaround time of the at least one shipping vessel does not impede the at least one agreed upon service frequency of the at least one port.

Moreover, decreasing the speed of the at least one shipping vessel and/or the at least one alternative shipping vessel and/or the at least one handing rate at the at least one port may increase the total cost of the payload (e.g., as containers will have to stay longer on board the at least one shipping vessel) and/or may be likely to cause late arrivals of the at least one shipping vessel at the at least one port. Hence, a decrease in the second objective preference $F_2$ may be likely to increase the first objective preference $F_1$, and/or vice versa. Note that, in this embodiment, the shipping schedule operating system may be configured to implement the SSP-CAT model, such that the first and second objective preferences are cost-related. Accordingly, the shipping schedule operating system may be configured to use the first and second objective preferences $F_1$ and $F_2$, respectively, of the SSP-CAT mathematical model and/or the unit costs of objective components (e.g., $\delta^{own}$, $\delta^{char}$, $\delta^{inv}$, $\delta_p{}^{late}$, $\delta_p{}^{fuel}$, $\delta_{pmth}{}^{hand}$, and $\delta^{emis}$) as at least one normalizing coefficient within the SSP-CAT model. The normalizing coefficients may be necessary for computing the at least one objective preference (e.g., the first and/or the second objective preference) components (e.g., the total fuel consumption, measured in tons of fuel, cannot be added to the total emission release, measured in tons of emissions, without applying at least one normalizing coefficient).

Moreover, in an embodiment, at least one operational constraint may directly be captured by the SSP-CAT mathematical model as implement by the shipping schedule operating system. The operational constraints may be divided into the following six groups. The first constraint group, which may be represented by constraints (4-3)-(4-7), as shown in the equations below, may be configured to focus on at least one main operation at the at least one port of the at least one shipping route. More specifically, in an embodiment, constraints (4-3) may be configured to guarantee that only one terminal of the at least one port will be selected for the service of the at least one shipping vessel at each of the at least one port of the at least one shipping route. Furthermore, constraints (4-4) and (4-5) may be configured to enforce the condition that only one time window will be chosen for the service of the at least one shipping vessel and/or alternative shipping vessel at each selected terminal of each of the at least one port of the at least one shipping route. On the other hand, in an embodiment, constraints (4-6) and (4-7) may be configured to enforce the condition that only one of the at least one handling rate will be used for the service of the at least one shipping vessel and/or the at least one alternative shipping vessel during the selected time window and terminal of each of the at least one port of the at least one shipping route. Constraints (4-3) to (4-7) are provided below:

$$\sum_{m \in M_p} x_{pm} = 1 \ \forall \ p \in P \tag{4-3}$$

$$\sum_{m \in M_p} \sum_{t \in T_{pm}} y_{pmt} = 1 \ \forall \ p \in P \tag{4-4}$$

$$y_{pmt} \le x_{pm} \ \forall \ p \in P, m \in M_p, t \in T_{pm} \tag{4-5}$$

$$\sum_{m \in M_p} \sum_{t \in T_{pm}} \sum_{h \in H_{pmt}} z_{pmth} = 1 \ \forall \ p \in P \tag{4-6}$$

$$z_{pmth} \le y_{pmt} \ \forall \ p \in P, m \in M_p, t \in T_{pm}, h \in H_{pmt} \tag{4-7}$$

In an embodiment, a second constraint group, which may be represented by constraints (4-8) and (4-9), may be configured to capture at least one limitation of the at least one sailing speed of the at least one shipping vessel and/or the at least one alternative shipping vessel, and/or may be configured to provide an estimate of the required amount of fuel of the at least one shipping vessel and/or the at least one alternative shipping vessel for the at least one shipping route. In particular, constraints (4-8) may ensure that the selected speed of the at least one shipping vessel and/or the at least one alternative shipping vessel will not be less than a lower bound and will not go beyond an upper bound. In this manner, constraints (4-9) may be configured to calculate the required amount of fuel of the at least one shipping vessel and/or the at least one alternative shipping vessel along each portion of the at least one shipping route based on the selected speed of the at least one shipping vessel and/or the at least one alternative shipping vessel as well as the payload being carried by the at least one shipping vessel and/or the at least one alternative shipping vessel.

$$s^{min} \le s_p \le s^{max} \ \forall \ p \in P \tag{4-8}$$

$$\varphi_p = \frac{\gamma(s_p)^{\alpha-1}}{24} \cdot \left( \frac{\phi_p^{sea} \cdot \varpi + \psi^{empty}}{\psi^{cap} + \psi^{empty}} \right)^{\frac{2}{3}} \ \forall \ p \in P \tag{4-9}$$

In addition, a third constraint group of the SSP-CAT model which may be implemented by the shipping schedule operating system, may be configured to provide a total amount of emission release by the at least one engine of the at least one shipping vessel and/or alternative shipping vessel at each portion of the at least one shipping route (constraints (4-10)) and/or may be configured to provide the total amount of emission release by the at least one designated handling equipment type during the service of the at least one shipping vessel and/or the at least one alternative shipping vessel at the at least one port (constraints (4-11)).

$$\xi_p^{sea} = \eta^{sea} \lambda_p \varphi_p \ \forall \ p \in P \tag{4-10}$$

$$\xi_p^{port} = \phi_p^{port} \sum_{m \in M_p} \sum_{t \in T_{pm}} \sum_{h \in H_{pmt}} \eta_{pmth}^{port} z_{pmth} \ \forall \ p \in P \tag{4-11}$$

Moreover, in an embodiment, a fourth constraint group, which may be represented by constraints (4-12)-(4-19), may be configured to compute at least one certain important time component, which may be directly used by the at least one shipping vessel and/or the at least one alternative shipping vessel including, but not limited to the following (i) the shipping time of the at least one shipping vessel and/or the at least one alternative shipping vessel at each portion of the at least one shipping route (constraints (4-12)), (ii) the arrival time of the at least one shipping vessel and/or the at least one alternative shipping vessel at each port of the at least one shipping route (constraints (4-13) and (4-14)), (iii) the late arrival time of the at least one shipping vessel and/or the at least one alternative shipping vessel at each port of the at least one shipping route (constraints (4-15)), (iv) the total waiting time of the at least one shipping vessel and/or the at least one alternative shipping vessel at each port of the at least one shipping route (constraints (4-16) and (4-17)), (v) the total handling time of the at least one shipping vessel and/or the at least one alternative shipping vessel at each port of the at least one shipping route (constraints (4-18)), and/or (vi) a departure time of the at least one shipping vessel and/or alternative shipping vessel from each port of the at least one shipping route (constraints (4-19)).

$$\tau_p^{sail} = \frac{\lambda_p}{s_p} \ \forall \ p \in P \tag{4-12}$$

$$\tau_{(p+1)}^{arr} = \tau_p^{dep} + \tau_p^{sail} \ \forall \ p \in P, p < |P| \tag{4-13}$$

$$\tau_1^{arr} = \tau_p^{dep} + \tau_p^{sail} - 168q \ \forall \ p \in P, p = |P| \tag{4-14}$$

$$\tau_p^{late} \ge \tau_p^{arr} - \sum_{m \in M_p} \sum_{t \in T_{pm}} \tau_{pmt}^{end} y_{pmt} \ \forall \ p \in P \tag{4-15}$$

-continued $$\tau_{(p+1)}^{wait} \geq \sum_{m \in M_p} \sum_{t \in T_{pm}} \tau_{(p+1)mt}^{st} y_{(p+1)mt} - \tau_p^{dep} - \tau_p^{sail} \tag{4-16}$$

$$\forall\ p \in P, p < |P|$$

$$\tau_1^{wait} \geq \sum_{m \in M_p} \sum_{t \in T_{pm}} \tau_{1mt}^{st} y_{1mt} - \tau_p^{dep} - \tau_p^{sail} + 168q \tag{4-17}$$

$$\forall\ p \in P, p = |P|$$

$$\tau_p^{hand} = \sum_{m \in M_p} \sum_{t \in T_{pm}} \sum_{h \in H_{pmt}} \left( \frac{\phi_p^{port}}{\pi_{pmth}} \right) z_{pmth}\ \forall\ p \in P \tag{4-18}$$

$$\tau_p^{dep} = \tau_p^{arr} + \tau_p^{wait} + \tau_p^{hand}\ \forall\ p \in P \tag{4-19}$$

Furthermore, in an embodiment, a fifth constraint group, which may be represented by constraints (4-20)-(4-23), may be configured to ensure that a target service frequency of the at least one port by the at least one shipping vessel and/or alternative shipping vessel is maintained for the at least one shipping route. More specifically, in an embodiment, constraints (4-20) may enforce at least one condition, such that each port of the at least one shipping route may be visited exactly once a week. In addition, constraints (4-21) may be configured to calculate the total number of shipping vessels and/or alternative shipping vessels which may be required to provide the weekly service frequency at each port of the at least one shipping route. Finally, in this embodiment, constraints (4-22) and (4-23) may be configured to guarantee that the total number of own shipping vessels and alternative shipping (e.g., chartered) vessels may not go beyond the available number of own shipping vessels and/or alternative (e.g., chartered) shipping vessels, respectively.

$$168q = \sum_{p \in P} \tau_p^{sail} + \sum_{p \in P} \tau_p^{hand} + \sum_{p \in P} \tau_p^{wait} \tag{4-20}$$

$$q = q^{own} + q^{char} \tag{4-21}$$

$$q^{own} \leq q^{own-max} \tag{4-22}$$

$$q^{char} \leq q^{char-max} \tag{4-23}$$

Finally, in an embodiment, the SSP-CAT model of the shipping schedule operating system may comprise a sixth constraint group, which may be represented by constraints (4-24)-(4-30). As such, the sixth constraint group may be configured to estimate the individual cost components which may be directly used for computing the first objective preference $F_1$ and the second objective preference $F_2$, respectively, of the SSP-CAT mathematical model of the shipping schedule operating system.

$$\Lambda^{own} = \delta^{own} q^{own} \tag{4-24}$$

$$\Lambda^{char} = \delta^{char} q^{char} \tag{4-25}$$

$$\Lambda^{inv} = \delta^{inv} \sum_{p \in P} \phi_p^{sea} \tau_p^{sail} \tag{4-26}$$

$$\Lambda^{late} = \sum_{p \in P} \delta_p^{late} \tau_p^{late} \tag{4-27}$$

$$\Lambda^{fuel} = \sum_{p \in P} \lambda_p \delta_p^{fuel} \varphi_p \tag{4-28}$$

-continued $$\Lambda^{port} = \sum_{p \in P} \sum_{m \in M_p} \sum_{t \in T_{pm}} \sum_{h \in H_{pmt}} \phi_p^{port} \delta_{pmth}^{hand} z_{pmth} \tag{4-29}$$

$$\Lambda^{emis} = \delta^{emis} \sum_{p \in P} \left( \xi_p^{sea} + \xi_p^{port} \right) \tag{4-30}$$

Accordingly, in an embodiment, the shipping schedule operating system may be configured to reduce the computational complexity of the SSP-CAT, via an application of at least one linearization technique. First, the speed reciprocal of the at least one shipping vessel and/or alternative shipping vessel, $s_p^r = 1/s_p \forall p \in P$ (knots$^{-1}$), may be used as a substitute of the speed of the at least one shipping vessel and/or alternative shipping vessel. Second, a continuous non-linear fuel consumption function, $\varphi_p$, $p \in P$ (tons/nmi), of the at least one shipping vessel and/or alternative shipping vessel may be configured to be transformed into a set of discrete points $K = \{1, \ldots, e\}$, such that $s_k^{val}$, $k \in K$ (knots$^{-1}$) may be the reciprocal value of speed of the at least one shipping vessel and/or alternative shipping vessel for at least discrete point k, and/or $\varphi_k^{val}$, $k \in K$ (tons/nmi) may be the value of a design fuel consumption estimate for the at least one shipping vessel and/or alternative shipping vessel, utilizing the reciprocal of speed of the at least one shipping vessel and/or alternative shipping vessel for at least discrete point k. Furthermore, in an embodiment, the shipping schedule operating system may be configured to assume $\beta_{pk}$ to be one (1) if at least discrete point k is used to provide the value of the design fuel consumption estimate of the at least one shipping vessel and/or alternative shipping vessel at each portion of the at least one shipping route p. As such, if at least discrete point k is not used to provide the value of the design fuel consumption estimate, then the shipping schedule operating system may be configured to assume $\beta_{pk}$ to be zero (0). In this manner, the shipping schedule operating system may be configured to present the original mixed integer non-linear multi-objective SSP-CAT model in a linearized form (hereinafter "SSP-CATL"), utilizing the following mathematical relationships:

$$\min F_1 = \left[ \Lambda^{own} + \Lambda^{char} + \Lambda^{inv} + \Lambda^{late} \right] \tag{5-1}$$

$$\min F_2 = \left[ \Lambda^{fuel} + \Lambda^{port} + \Lambda^{emis} \right] \tag{5-2}$$

Subject to: Constraints $(4-3) - (4-7)$, $(4-10) - (4-11)$, and $$(4-13) - (4-30)$$

$$\sum_{k \in K} \beta_{pk} = 1\ \forall\ p \in P \tag{5-3}$$

$$s_p^r = \sum_{k \in K} \beta_{pk} s_k^{val}\ \forall\ p \in P \tag{5-4}$$

$$\varphi_p = \sum_{k \in K} \beta_{pk} \varphi_k^{val} \cdot \left( \frac{\phi_p^{sea} \cdot \varpi + \psi^{empty}}{\psi^{cap} + \psi^{empty}} \right)^{\frac{2}{3}}\ \forall\ p \in P \tag{5-5}$$

$$\tau_p^{sail} = \lambda_p s_p^r\ \forall\ p \in P \tag{5-6}$$

$$\frac{1}{s^{max}} \leq s_p^r \leq \frac{1}{s^{min}}\ \forall\ p \in P \tag{5-7}$$

In an embodiment, the first and/or second objective preferences $F_1$ and $F_2$ may be configured to minimize the at least one conflicting cost, such that the SSP-CATL model of the shipping schedule operating system may be optimized. In this manner, constraints (5-3) may be configured to ensure that at least one discrete point may be used to calculate the value of the design fuel consumption estimation for the at least one shipping vessel and/or alternative shipping vessel at each portion of the at least one shipping route. Additionally, in an embodiment, constraints (5-4) may calculate the reciprocal speed value of the at least one shipping vessel and/or alternative shipping vessel by using the at least one discrete point selected at each portion of the at least one shipping route. Moreover, constraints (5-5) may be configured to compute the fuel consumption of the at least one shipping vessel and/or alternative shipping vessel by using the at least one discrete point selected at each portion of the at least one shipping route, while directly considering the ship payload. In addition, as shown above, constraints (5-6) may calculate the total shipping time of the at least one shipping vessel and/or alternative shipping vessel at each portion of the at least one shipping route. Finally, constraints (5-7) may be configured to impose at least one bound on the reciprocal speed value of the at least one shipping vessel and/or alternative shipping vessel.

Next, as shown in FIG. 2, at step 204, the processor of the computing device may be configured to transmit an objective of a collaborative agreement to the shipping schedule operating system. For example, if the collaborative agreement is between the at least one shipping vessel and the at least one operating terminal of the at least one port and may executable and/or launched on the computing device, the processor may be configured to transmit the standardized objective to the shipping schedule operating system. Further, at step 206, the shipping schedule operating system may queue the standardized objective of the collaborative agreement, such as the default objective for the collaborative agreement. Following the shipping schedule operating system queuing the standardized objective of the collaborative agreement, at step 208, the shipping schedule operating system may then compare the received standardized objective of the collaborative agreement with the predetermined objective preference of the collaborative agreement.

Accordingly, in an embodiment, the shipping schedule operating system may comprise at least two algorithms, including but not limited to the ε-constraint method (hereinafter "ECON") and the goal programming method (hereinafter "GP"). As such the shipping schedule operating system may be configured to integrate both the ECON method and the GP method into at least one algorithm, the combination herein referred to as "ECON-GP", such that the shipping schedule operating system may solve the SSP-CATL model. As known in the art, the ECON method may minimize at least one objective preference of the optimization model (generally, the most important one from the practical point of view) and may impose at least one bound on at least one alternative objective preference (Mavrotas, 2009). Additionally, in an embodiment, utilizing the ECON method and/or the GP method, alone, or in addition to the ECON-GP method, the shipping schedule operating system may be configured to develop a Pareto Front (PF) by iteratively changing the at least one bound value. In this manner, as known in the art, the GP method may set certain target values for the considered objective preferences of the optimization model, aiming to minimize the total deviation of the objective preference values from the established target values (Deb, 1999).

Figures 5A, 5B:
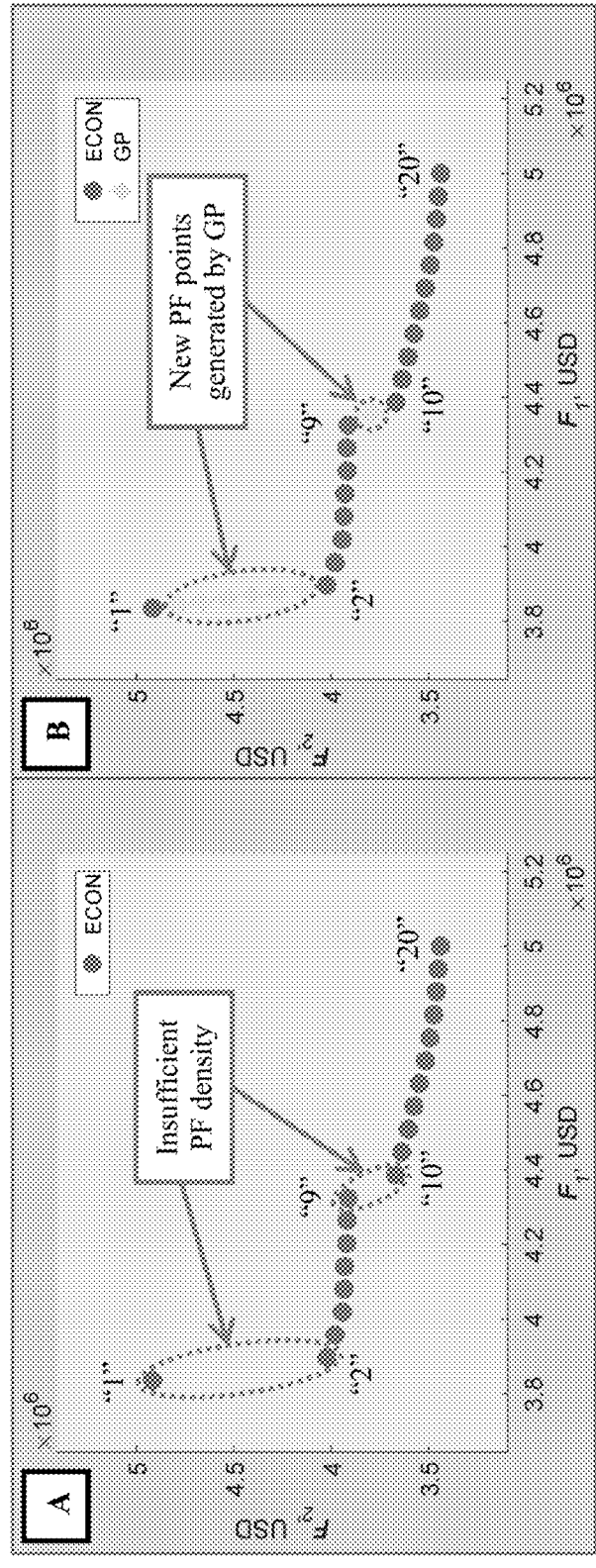
FIGS. 5A-5B graphically depict a Pareto Front (hereinafter "PF") model generated by ECON and ECON-GP methods, according to an embodiment of the present disclosure.

However, it is clear that, individually, the ECON method and the GP method both comprise substantial limitations. For example, as shown in FIG. 5A, the ECON method may generate a PF with insufficient density. In this example, the PF may comprise 20 points, where evenly-spaced bounds are imposed on the first objective preference $F_1$. However, as shown FIG. 5A, in this example, after solving the optimization model and minimizing the second objective preference $F_2$ (while iteratively imposing certain bounds on the objective preference $F_1$), the distance amongst some of the consecutive PF points in terms of the $F_2$ interval may be significant, which may cause the insufficient PF density (e.g., the distance amongst points "1" and "2" as well as the distance amongst points "9" and "10"). As for the GP method, in particular, the major limitation of the GP method consists in the fact that it may be difficult to know accurate target values for the at least one objective preference a priori in some instances, and, in addition, the obtained solutions may have at least one objective preference which may be significantly altered from the at least one objective preference target of the GP model.

TABLE 5

ECON-GP(InputData, $PF^{size}$, $\varepsilon_1$, $\varepsilon_2$, $GP^{tol}$, $\delta^{F1}$, $\delta^{F2}$)
in: InputData – the SSP-CATL input data; $PF^{size}$ – PF size; $\varepsilon_1$ – upper bound on $F_1$; $\varepsilon_2$ – upper bound on $F_2$; $GP^{tol}$
- the GP tolerance value; $\delta^{F1}$ – penalty for $F_1$ violation; $\delta^{F2}$ – penalty for $F_2$ violation
out: PF – PF for the SSP-CATL model

```
 0:    PF ← ECON(InputData, PFsize, ε1, ε2)◁ Apply ECON to generate the initial PF
 1:    iter ← 1◁ Start the iteration counter
 2:    while-1 iter ≤ (PFsize – 1) do
 3:        Δ ← PF(iter + 1,2) – PF(iter, 2)◁ Estimate the F2 interval
 4:        iter ← iter + 1◁ Update the iteration counter
 5:    end while-1
 6:    iter1 ← 1◁ Start the iteration counter
 7:    while-2 iter1 ≤ (PFsize – 1) do
 8:        if Δ(iter1) > GPtol · mean(Δ) then◁ Check whether the desired PF density is achieved
 9:            PFadd ← Δ(iter1)/[GPtol · mean(Δ)]◁ Determine the required number of additional PF points
10:            ΔF1 ← [PF(iter1 + 1,1) – PF(iter1, 1)]/PFadd◁ Determine the F1 interval amongst the new points
11:            ΔF2 ← [PF(iter1 + 1,2) – PF(iter1, 2)]/PFadd◁ Determine the F2 interval amongst the new points
12:            iter2 ← 1◁ Start the iteration counter
13:            while-3 iter2 ≤ (PFadd – 1) do
14:                F1target← PF(iter1, 1) + ΔF1 · iter2◁ Estimate the F1 target value
15:                F2target← PF(iter1, 2) + ΔF2 · iter2◁ Estimate the F2 target value
16:                [F1GP; F2GP] ← GP(InputData, F1target, F2target, δF1, δF2)◁ Apply GP to generate the new PF point
17:                PF ← PF ∪ [F1GP; F2GP]◁ Append the additional PF point to the PF
18:                iter2 ← iter2 + 1◁ Update the iteration counter
19:            end while-3
20:        end if
21:        iter1 ← iter1 + 1◁ Update the iteration counter
22:    end while-2
23:    return PF
```

Moreover, in an embodiment, the shipping schedule operating system may be configured to incorporate the ECON-GP method, such that the limitations, as stated above, may be overcome, thereby optimizing at least one collaborative agreement between the at least one shipping vessel and/or the at least one terminal operator. As such, the ECON-GP method may be configured to rely on standard features of the ECON and the GP methods. Additionally, the shipping schedule operating system may comprise at least one algorithm which may be configured to incorporate the ECON-GP features. As shown in TABLE 5, above, Algorithm 1 may comprise the key steps of the ECON-GP. In this manner, in an embodiment, as shown in TABLE 5, first, the ECON-GP model of the shipping schedule operating system may be configured to solve a given multi-objective optimization problem by using the canonical ECON method, such that at least one of the objective preferences may be optimized, while a certain bound may be imposed on the at least one alternative objective preference (e.g., step 0 in Algorithm 1). Moreover, the shipping schedule operating system may be configured to develop the PF by iteratively changing the bound of the at least one alternative objective preference until the desired number of PF points may be obtained (e.g., FIG. 5A, where the second objective preference $F_2$ is minimized, and evenly-spaced bounds are imposed on the first objective preference $F_1$). In the considered example, as shown in FIG. 5A, a total of 20 PF points may be generated after applying the ECON method and following the steps outlined in Algorithm 2, as shown in TABLE 6, provided below.

$F_2$ interval amongst PF points "9" and "10" may not meet the at least one predetermined requirement. Hence, as shown in FIG. 5B, the shipping schedule operating system may be configured to implement the canonical GP method to generate at least one additional point for the at least one objective interval such that the ideal PF density may be obtained. In this manner, the target optimized value (e.g., first and/or second objective preference) for the at least one standard contract component required by the GP method may be set by means of interpolation amongst the points that have excessive objective intervals (e.g., steps 9-19 in Algorithm 1).

Moreover, in an embodiment, the shipping schedule operating system may comprise the ECON-GP method such that the ECON-GP method may be configured to iteratively solve at least one optimization model throughout their execution, including, but not limited to the following: (i) the GP model solved in step 16 of Algorithm 1, (ii) the SSP-CATL-1 model solved in step 1 of Algorithm 2, and (iii) the SSP-CATL-2 model solved in step 2 of Algorithm 2. Accordingly, the GP mathematical model may be configured to minimize the total penalty due to at least one positive and/or negative deviation of the at least one objective preference (e.g., the first and/or second objective preference $F_1$ and $F_2$, respectively) based on the data of the at least one standard contract component inputted into the optimization model, the at least one positive and/or negative deviation being denoted as $\Delta F_1^+$, $\Delta F_1^-$, $\Delta F_2^+$, and $\Delta F_2^-$, respectively, from their target values (denoted as $F_1^{target}$ and $F_2^{target}$, respectively), may be formulated using additional equations (5-8)-(5-12). In addition, the

TABLE 6

```
ECON(InputData, PF^size, ε_1, ε_2)
in: InputData – the SSP-CATL input data; PF^size – PF size; ε_1 – upper bound on F_1; ε_2 – upper bound on F_2
out: PF – PF for the SSP-CATL model
0:       |PF| ← PF^size ◁ Initialization
1:       [F_1*; F_2(F_1*)] ← SSP-CATL-1(InputData, ε_2)◁ Determine the F_1* corner point
2:       [F_1(F_2*); F_2*] ← SSP-CATL-2(InputData, ε_1)◁ Determine the F_2* corner point
3:       ε ← (F_1(F_2*) – F_1*)/(PF^size – 1)◁ Calculate the upper bound interval for F_1
4:       iter ← 1◁ Start the iteration counter
5:       ε_1(iter) ← F_1*◁ Set the first upper bound on F_1
6:       PF ← PF ∪ [F_1*; F_2(F_1*)]◁ Append the F_1* corner point
7:       while iter ≤ (PF^size – 2) do
8:          iter ← iter + 1:◁ Update the iteration counter
9:          ε_1(iter) ← ε_1(iter-1) + ε◁ Update the upper bound on F_1
10:         [F_1(F_2(iter)*); F_2(iter)*] ← SSP-CATL-2(InputData, ε_1(iter))
11:         PF ← PF ∪ [F_1(F_2(iter)*); F_2(iter)*]◁ Append the newly generated PF point to the PF
12:      end while
13:      PF ← PF ∪ [F_1(F_2*); F_2*]◁ Append the F_2* corner point
14:      return PF
```

Accordingly, in an embodiment, after obtaining the initial PF using the ECON method, ECON-GP may then be configured to estimate the at least one objective interval amongst consecutive PF points (e.g., steps 1-5 in Algorithm 1) and may be configured to verify if any of the consecutive PF points of the at least one objective interval do not comprise the desired density (e.g., steps 6-22 in Algorithm 1). Therefore, when the second objective $F_2$ is minimized in the considered example, the at least one objective interval for the second objective $F_2$ may be estimated. As such, if the at least one objective interval does not satisfy at least one predetermined requirement, defined using at least one GP tolerance value—$GP^{tol}$, the ECON-GP may be configured to deploy the canonical GP method (e.g., step 16 in Algorithm 1). For example, in an embodiment, the at least one objective interval of the second objective preference $F_2$ interval amongst PF points "1" and "2" and the at least one alternative objective interval of the second objective preference ECON-GP method may comprise at least one parameter, such that the parameters $\delta^{F_1}$ and $\delta^{F_2}$ may comprise the penalty values for the at least one deviation of the at least one objective preference (e.g., first objective preference $F_1$ and/or second objective preference $F_2$). Additionally, in an embodiment, the SSP-CATL-1 mathematical model of the shipping schedule operating system, configured to minimize the first standard contract component $F_1$ while imposing a certain bound on the second standard contract component $F_2$, may be formulated using additional equations (5-13)-(5-15). Furthermore, in an embodiment, the SSP-CATL-2 mathematical model, configured to minimize the second standard contract component $F_2$ while imposing a certain bound on the first standard contract component $F_1$, may be represented using additional equations (5-16)-(5-18). The equations for the mathematical models are provided below:

GP: Goal Programming Method:

$$\min \left[\delta^{F_1} \cdot (\Delta F_1^+ + \Delta F_1^-) + \delta^{F_2} \cdot (\Delta F_2^+ + \Delta F_2^-)\right] \qquad (5\text{-}8)$$

Subject to: Constraints (4-3)-(4-7), (4-10)-(4-11), (4-13)-(4-30), and (5-3)-(5-7)

$$F_1=[\Lambda^{own}+\Lambda^{char}+\Lambda^{inv}+\Lambda^{late}] \qquad (5\text{-}9)$$

$$F_2=[\Lambda^{fuel}+\Lambda^{port}+\Lambda^{emis}] \qquad (5\text{-}10)$$

$$F_1-\Delta F_1{}^{+}+\Delta F_1{}^{-}=\Delta F_1{}^{target} \qquad (5\text{-}11)$$

$$F_2-\Delta F_2{}^{+}+\Delta F_2{}^{-}=\Delta F_2{}^{target} \qquad (5\text{-}12)$$

SSP-CATL-1: SSP-CATL With $F_1$ Minimization:

$$\min F_1=[\Lambda^{own}+\Lambda^{char}+\Lambda^{inv}+\Lambda^{late}] \qquad (5\text{-}13)$$

Subject to: Constraints (4-3)-(4-7), (4-10)-(4-11), (4-13)-(4-30), and (5-3)-(5-7)

$$F_2=[\Lambda^{fuel}+\Lambda^{port}+\Lambda^{emis}] \qquad (5\text{-}14)$$

$$F_2 \le \varepsilon_2 \qquad (5\text{-}15)$$

SSP-CATL-2: SSP-CATL With $F_2$ Minimization:

$$\min F_2=[\Lambda^{fuel}+\Lambda^{port}+\Lambda^{emis}] \qquad (5\text{-}16)$$

Subject to: Constraints (4-3)-(4-7), (4-10)-(4-11), (4-13)-(4-30), and (5-3)-(5-7)

$$\min F_1=[\Lambda^{own}+\Lambda^{char}+\Lambda^{inv}+\Lambda^{late}] \qquad (5\text{-}17)$$

$$F_1 \le \varepsilon_1 \qquad (5\text{-}18)$$

Finally, referring again to FIG. 2, the method may then proceed to either step 210 or step 212 depending on whether a substantial match exists between the standardized objective and the predetermined objective preference of the collaborative agreement.

Accordingly, during step 210, in an embodiment, the shipping schedule operating system may determine that a substantial match does not exist between the standard contract component of the collaborative agreement and the objective preference of the predetermined optimal collaborative agreement designed for the collaborative agreement. In this manner, at step 210, the shipping schedule operating system may execute instructions, via the processor of the computing device, to activate the objective preference, converting the at least one standard contract component with the at least one objective preference of the predetermined optimal collaborative agreement. Therefore, the shipping schedule operating system associated with the computing device modifies the collaborative agreement, in real-time, such that the collaborative agreement is optimized to reach the target objective preference.

Figure 9:
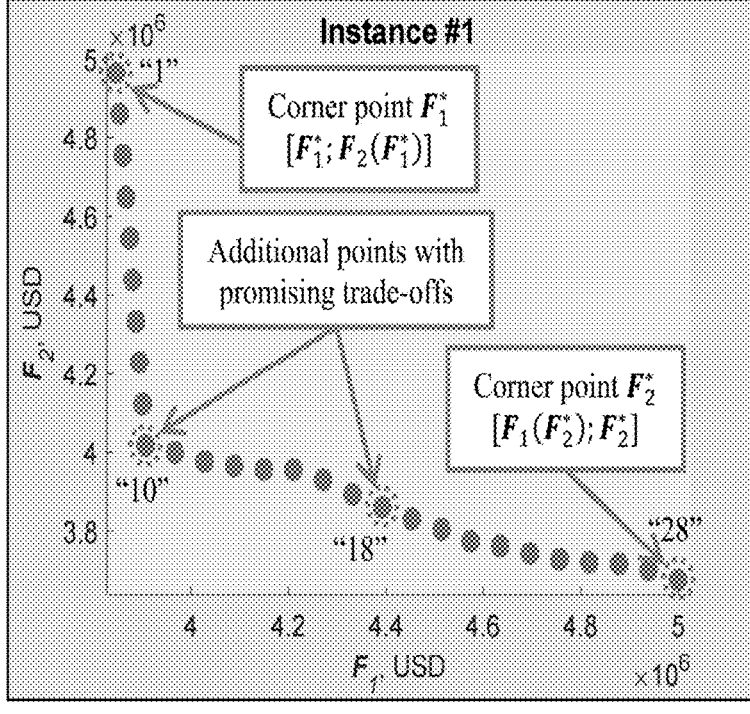
FIG. 9 graphically depicts an analysis of trade-offs among conflicting objectives for a problem instance, according to an embodiment of the present disclosure.
Figures 10A, 10B, 10C, 10D, 10E, 10F, 10G, 10H, 10I, 10J, 10K, 10L:
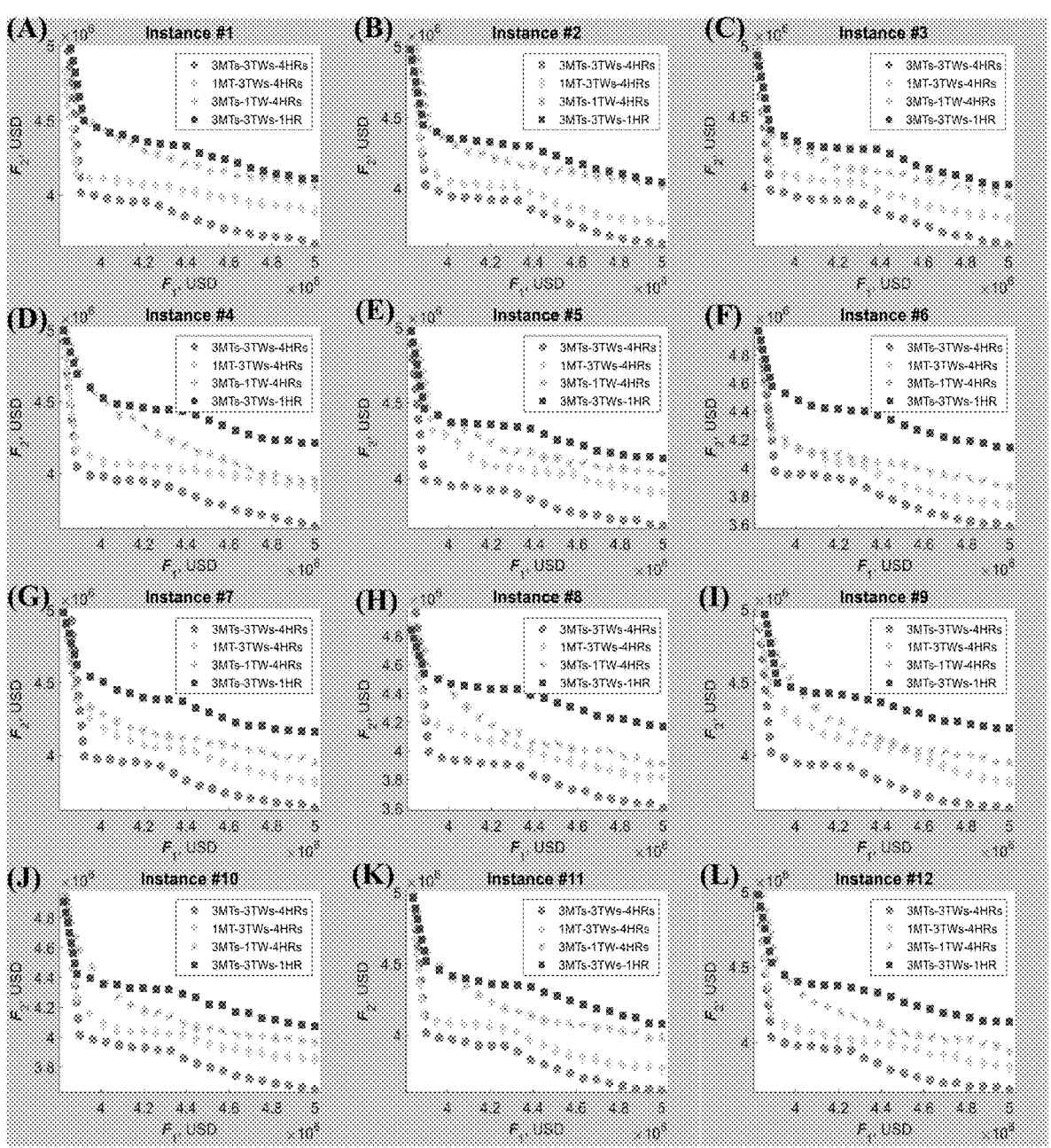
FIGS. 10A-10L graphically depict PF models obtained by an ECON-GP method for generated scenarios of collaborative agreements and problem instances, according to an embodiment of the present disclosure.
Figures 11A, 11B, 11C, 11D, 11E, 11F, 11G, 11H:
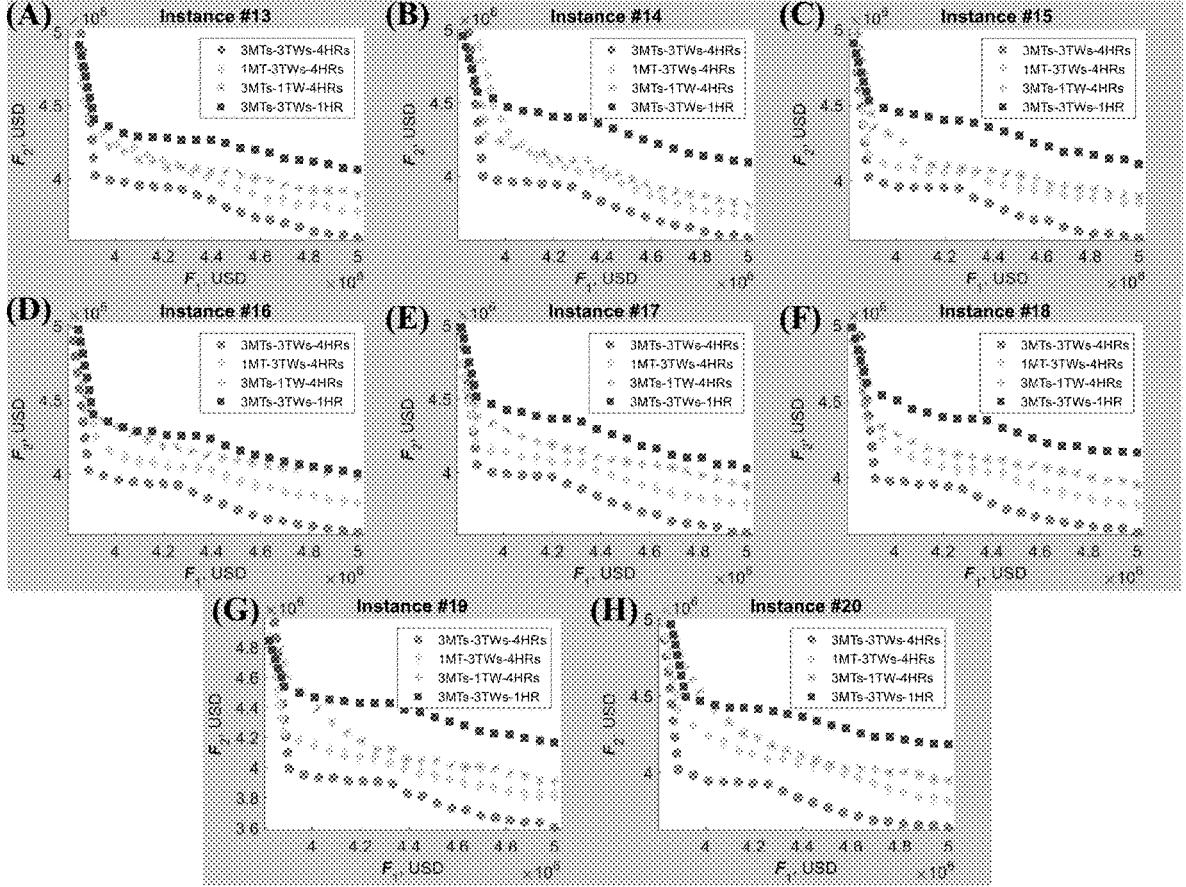
FIGS. 11A-11H graphically depicts PF models obtained by an ECON-GP method for generated scenarios of collaborative agreements and problem instances, according to an embodiment of the present disclosure.

In this manner, in an embodiment, the shipping schedule operating system may be configured to evaluate, via a supplemental analysis, at least one trade-off amongst the conflicting standard contract components. The evaluation by the shipping schedule operating system may be accomplished by extracting the solution data for at least one corner PF point obtained by ECON-GP for at least one of the considered problem instances. Note that the at least one corner PF point may correspond to the points that have the at least one optimized (e.g., the minimum) value of the at least one objective preference (the first and/or second objective preference $F_1$ and $F_2$, respectively) and may be denoted as $F_1{}^*$ and $F_2{}^*$, respectively, as shown in FIG. 9, such that at least one PF corner point and/or the entire PF points are shown for the given problem instance. In an embodiment, the following data may be presented for each of the corner PF points and each of the problem instances, including but not limited to (i) the $F_1$ first standard contract component value, (ii) the $F_2$ second standard contract component value, (iii) the average speed of the at least one shipping vessel and/or alternative shipping vessel which may be weighted by each portion of the at least one shipping route ($s^wW$), (iv) the total waiting time of the at least one shipping vessel and/or alternative shipping vessel at the at least one port ($\tau^{wait}$), (v) the total handling time of the at least one shipping vessel and/or alternative shipping vessel at the at least one port ($\tau^{hand}$), (vi) the total shipping time of the at least one shipping vessel and/or alternative shipping vessel for the at least one shipping route ($\tau^{sail}$), (vii) the total late arrivals of the at least one shipping vessel and/or alternative shipping vessel at the at least one port ($\tau^{late}$), (viii) the total fuel consumption of the at least one shipping vessel and/or alternative shipping vessel ($\varphi$); (ix) the total emission released value of the at least one shipping vessel and/or alternative shipping vessel for the at least one shipping route ($\tau^{sea}$), (x)) the total emission released value of the at least one shipping vessel and/or alternative shipping vessel at the at least one port ($\tau^{port}$), (xi) the total number of vessels deployed (q); (xii) the total number of own shipping vessels deployed ($q^{own}$), and/or (xiii) the total number of alternative (e.g., chartered) vessels deployed ($q^{char}$).

As such, in an embodiment, as shown in FIGS. 7-11H, based on the outcomes from the performed analysis, the shipping schedule operating system may determine that at least one shipping schedule comprising at least one $F_1$ minimum value (e.g., the at least one $F_1{}^*$ shipping schedule) may substantially vary from the at least one shipping schedule comprising at least one $F_2$ minimum value (e.g., the at least one $F_2{}^*$ shipping schedule). For example, if the at least one shipping vessel followed at least one environmental sustainability goal and/or selected the at least one $F_2{}^*$ shipping schedule, the at least one shipping vessel may be configured to reduce an average sailing speed of the at least one shipping vessel by a range of at least 15% to at most 50%, encompassing every integer in between, as compared to the at least one shipping vessel which may have incorporated the at least one $F_1{}^*$ shipping schedule. Accordingly, the decrease in the average sailing speed may then reduce an average fuel consumption and the associated emission release of the at least one shipping vessel and/or alternative shipping vessel throughout each portion of the at least one shipping route by at least 40% for the at least one $F_2{}^*$ shipping schedule. Furthermore, in an embodiment, if the at least one own shipping vessel and/or alternative shipping vessel decide to follow the at least one environmental sustainability goal and/or select the at least one $F_2{}^*$ shipping schedule, an average emission release produced by the at least one designated handling equipment type throughout the service of the at least one shipping vessel and/or alternative shipping vessel at the at least one port may be reduced by at least 45%, as compared to the at least one shipping vessel and/or alternative shipping vessel which may follow the at least one $F_1{}^*$ shipping schedule, by means of selecting at least one lower handling rate.

However, in this manner, by decreasing the speed of the at least one shipping vessel, alternative vessel, and/or handling rate at the at least one port, the shipping schedule operating system may be configured to increase an average amount of time spent at sea and ports by at least 15%. As such, an increase in the total time the at least one shipping vessel and/or alternative shipping vessel requires to complete the at least one shipping route may further lead to an increase in the total turnaround time of the at least one shipping vessel and/or alternative shipping vessel. Moreover, in some embodiments, due to the increase in the total time the at least one shipping vessel requires to complete the at least one shipping route, the shipping schedule operating system may be configured to incorporate at least one alternative shipping vessel to ensure that the at least one agreed upon service frequency of the at least one collaborative agreement is met.

For example, where the shipping schedule operating system of the at least one shipping vessel follows at least one $F_2^*$ shipping schedule within the at least one collaborative agreement to ensure the weekly service frequency at each of the at least one port of the at least one shipping route, the shipping schedule operating system may be configured to incorporate at least 6 shipping vessels to meet the agreed upon weekly service frequency. Accordingly, in this example, where the shipping schedule operating system of the at least one shipping vessel follows at least one $F_1^*$ shipping schedule within the at least one collaborative agreement to ensure the weekly service frequency at each of the at least one port of the at least one shipping route, the shipping schedule operating system may be configured to incorporate at least 5 shipping vessels to meet the agreed upon weekly service frequency. Accordingly, in this example, the at least one shipping vessel following at least one $F_2^*$ shipping schedule included more late arrivals, but lower waiting times at the at least one port as compared to the at least one shipping vessel following the at least one $F_1^*$ shipping schedule.

Additionally, in an embodiment, the shipping schedule operating system may incorporate the at least one $F_2^*$ shipping schedule to reduce the at least one second standard contract component $F_2$ by at least 25%, as compared to the at least one shipping vessel comprising the at least one $F_1^*$ shipping schedule, but may be configured to increase the at least one first standard contract component $F_1$ by at least 15%. Moreover, as shown in FIGS. 9-11H, the at least one corner PF point may be viewed as the most radical ship scheduling decision (e.g., strictly following the at least one economic perspective by selecting only the at least one $F_1^*$ shipping schedule and/or strictly following the environmental perspectives by selecting only the at least one $F_2^*$ shipping schedule).

Furthermore, in an embodiment, the shipping schedule operating system may be configured to incorporate all metrics of the at least one shipping vessel and/or the alternative shipping vessel, such that the shipping schedule operating system may determine the optimum combination of the at least one $F_1^*$ shipping schedule and the at least one $F_2^*$ shipping schedule, thereby optimizing the at least one shipping vessel and/or alternative shipping vessel efficiency and/or service frequency at each portion of the at least one shipping route, including the at least one port of the at least one shipping route. Additionally, in an embodiment, the at least one environmental perspective and/or economic perspective may be preselected by the shipping schedule operating system and/or at least one shipping schedule user, such that the optimization model may be configured to create the most optimized shipping schedule based on the preferences.

Accordingly, in an embodiment, as shown in FIG. 9, in conjunction with FIGS. 10A-11H, the shipping schedule operating system may be configured to identify at least one standard contract component within the collaborative agreement which may not be optimized based on the at least one metric of the at least one shipping vessel, at least one terminal operator, and/or at least one alternative shipping vessel, and/or automatically update and/or restructure the at least one collaborative agreement, in real-time, between the at least one shipping vessel and/or the at least one terminal operator based on the at least one environmental perspective and/or economic perspective chosen by the shipping schedule operating system and/or the at least one shipping schedule user. In this manner, the shipping schedule operating system may be configured to transmit the updated and/or restructured at least one collaborative agreement to the at least one terminal operator, the at least one shipping vessel, and/or the at least one alternative shipping vessel, requesting approval of the updated and/or restructured at least one collaborative agreement from the at least one terminal operator, the at least one shipping vessel, and/or the at least one alternative shipping vessel.

Additionally, in an embodiment, based on the at least one objective preference and the at least one standard contract component (e.g., the original agreed upon objective of the at least one original collaborative agreement and/or the objective selected based on the at least one metric of the at least one shipping vessel, the at least one alternative shipping vessel, and/or the at least one terminal operator), the shipping schedule operating system may be configured to automatically update the at least one standard contract component to the objective preference, within a range of bounds, as provided by the optimization model of the shipping schedule operating system. In this manner, the shipping schedule operating system may be configured to be in communication with any of the following including but not limited to, the at least one engine of the at least one shipping vessel and/or the alternative shipping vessel and/or the at least one designated handling equipment type of the at least one terminal operator.

As such, the shipping schedule operating system may be configured to automatically change the at least one metric of the at least one shipping vessel, at least one alternative shipping vessel, and/or the at least one terminal operator, such that the efficiency of the at least one shipping vessel, alternative shipping vessel and/or the terminal operator is optimized, such that the agreed upon service frequency of the at least one shipping route may be met. In some embodiments, based on the at least one objective preference and/or the standard contract component, the shipping schedule operating system may be configured to notify the at least one shipping schedule user of potential optimization based on the at least one economic perspective and/or environmental perspective selected for the at least one objective preference.

Furthermore, in an embodiment, the shipping schedule operating system may be configured to be in communication with at least one third-party database, such that the at least one standard contract component may be automatically updated and/or restructured, in real-time, based on the at least one database. As used herein, the term "third-party database" refers to any database known in the art which may provide any regulation or metric known in the art which may impact a collaborative agreement between the at least one shipping vessel and/or the at least one terminal operator. For ease of reference, the exemplary embodiment described herein refers to an emissions regulation database, but this description should not be interpreted as exclusionary of other metric and/or regulation databases.

For example, if at least one governmental entity implements at least one new emissions regulation, the shipping schedule operating system may be configured to automatically update and/or restructure the at least one collaborative agreement between the at least one shipping vessel, alternative shipping vessel and/or terminal operator, such that the at least one collaborative agreement conforms to the at least one new emissions regulation. Accordingly, in an embodiment, the shipping schedule operating system may be configured to automatically alter the output of the at least one engine of the at least one shipping vessel and/or the alternative shipping vessel and/or the designated handling equipment of the at least one terminal operator, such that the performance and service of the at least one shipping vessel and/or alternative shipping vessel, and/or the at least one terminal operator may conform to the new regulation. In this manner, the shipping schedule operating system may be configured to notify the at least one shipping schedule user of each new regulation which may be implemented by the at least one governmental entity, in real-time, via the communication with the at least one third-party database.

Additionally, as shown in FIGS. 9-11H, in an embodiment, the at least one optimization model of the shipping schedule operating system may comprise at least one intermediate PF point, which may be identified by ECON-GP, such that the at least one intermediate PF point comprises the considered objective preferences (e.g., the economic perspective objective and the environmental perspective objective). For example, as shown in FIG. 9, in an embodiment, the shipping schedule operating system may be configured to not only allow, at PF point "10," the reduction of the first standard contract component $F_1$ value by at least 15%, as compared to the $F_1(F_2{}^*)$ point, but may also be configured to decrease the second standard contract component $F_2$ value by at least 10%, as compared to the $F_2(F_1{}^*)$ point. However, on the other hand, in this embodiment, the shipping schedule operating system may be configured to not only allow, at the PF point "18," the reduction of the first standard contract component $F_1$ value by at least 5%, as compared to the $F_1(F_2{}^*)$ point, but may also be configured to allow the decrease of the second standard contract component $F_2$ value by at least 15%, when comparing to the $F_2(F_1{}^*)$ point.

Therefore, the developed multi-objective SSP-CATL mathematical model and/or any iterations disclosed herein, along with the proposed ECON-GP solution method, and/or any iterations disclosed herein, may be configured to effectively optimize the shipping schedule operating system for the at least one shipping vessel, alternative shipping vessel, and/or terminal operator, and/or assist with the analysis of trade-offs amongst the conflicting objectives (e.g., the standard contract component vs. the objective preferences comprising at least one economic perspective and/or environmental perspective) in order to optimize the at least one shipping vessel, alternative shipping vessel, and/or terminal operator service efficiency and/or environmental efficiency.

Furthermore, in an embodiment, the shipping schedule operating system may be configured to assist at least one shipping vessel, alternative shipping vessel, and/or terminal operator with the identification of optimized shipping routes, emission release, and/or any shipping metric known in the art, such that the at least one shipping vessel, alternative shipping vessel, and/or terminal operator may conform the at least one collaborative agreement to the optimized metrics, increasing both economic and/or environmental efficiency.

Referring again to FIG. 2, during step 212, in an embodiment, the shipping schedule operating system may determine that a substantial match does exist between the standardized objective of the collaborative agreement and the objective preference of the predetermined optimal collaborative agreement designed for the collaborative agreement. Accordingly, at step 212, the shipping schedule operating system may execute instructions, via the processor of the computing device, to activate the standardized objective, such that the shipping schedule operating system maintains the standardized objective of the collaborative agreement, in real-time, as the standardized objective is already the most optimal solution for the collaborative agreement.

The following examples are provided for the purpose of exemplification and are not intended to be limiting.

EXAMPLES

Example 1

Figure 6:
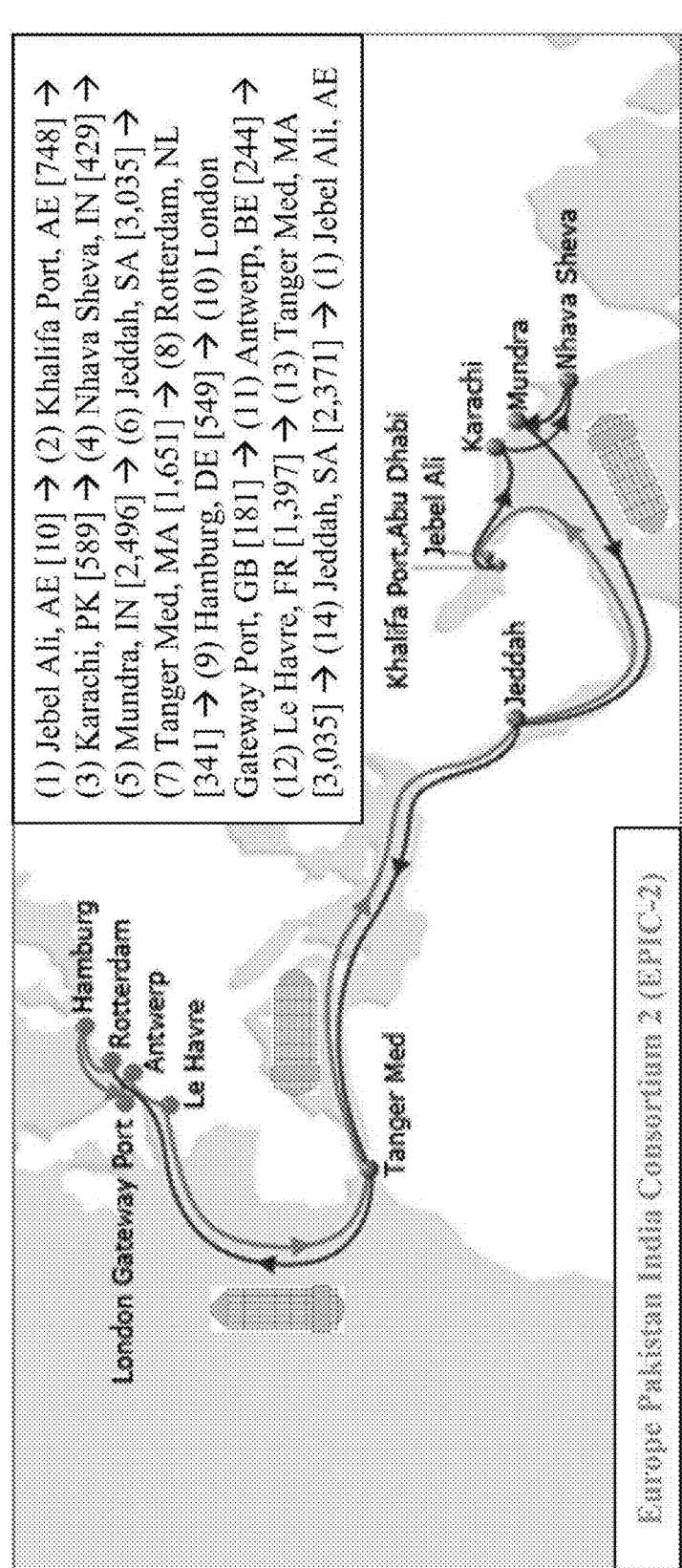
FIG. 6 is a schematic illustration of a shipping route, according to an embodiment of the present disclosure.

Evaluation and Analysis of SSP-CATL Model for the Europe Pakistan India Consortium 2 Shipping Route The computational experiments were performed for the Europe Pakistan India Consortium 2 (EPIC-2) shipping route, which is currently serviced by the Compagnie Maritime d'Affrètement and Compagnie Générale Maritime (hereinafter "CMA CGM") shipping line. A graphical illustration of the considered shipping route is provided in FIG. 6, where the length of voyage legs connecting consecutive ports is presented in square brackets. The adopted values of the input data that were used for the developed mixed integer multi-objective SSP-CATL mathematical model throughout the computational experiments are presented in TABLE 7. The input data were primarily adopted from the open data sources as well as the previous studies on shipping vessels (Dulebenets, 2018a-f; Abioye et al. 2019; Ozcan et al. 2020; Zhao et al., 2020; CMA CGM, 2021; Pasha et al., 2021; Ports.com, 2021; Yu et al; 2021). The following focuses on the evaluation of the proposed solution methodology and showcases certain important managerial insights using the developed multi-objective SSP-CATL mathematical model. A total of 20 problem instances were generated by altering the start and end of each time window at ports of the considered shipping route to conduct the computational experiments.

TABLE 7

| Model Parameter | Adopted Value |
|---|---|
| Total number of ports under a given port rotation - a (ports) | 14 |
| Total number of terminals available at port p - $b_p$, $p \in P$ (ports) | 3 |
| Total number of ship arrival time windows available at terminal m of port p - $c_{pm}$, $p \in$ P, m $\in M_p$ (time windows) | 3 |
| Total number of handling rates available at terminal m of port p during time window t - $d_{pmt}$, $p \in$ P, m $\in M_p$, t $\in T_{pm}$ (rates) | 4 |
| Coefficients for ship fuel consumption - $\alpha$, $\gamma$ | $\alpha = 3$, $\gamma = 0.012$ |
| Average cargo weight inside a standard 20-ft container - $\bar{\omega}$ (tons) | 11 |
| Empty weight of a ship to be deployed - $\psi^{empty}$ (tons) | 50,000 |
| Total capacity of a ship to be deployed - $\psi^{cap}$ (tons) | 150,000 |
| Emission factor at sea - $\eta^{sea}$ (tons of emissions/ton of fuel) | 3.114* |
| Emission factor for the ship service under handling rate h at terminal m of port p during time window t - $\eta_{pmth}^{port}$, $p \in$ P, m $\in M_p$, t $\in T_{pm}$, h $\in H_{pmt}$ (tons of emissions/TEU) | 0.01729 for h = 180* |

TABLE 7-continued

| Model Parameter | Adopted Value |
|---|---|
| Handling productivity for handling rate h that will be used for the ship service at terminal m of port p during time window t - $\pi_{pmth}$, p ∈ P, m ∈ $M_p$, t ∈ $T_{pm}$, h ∈ $H_{pmt}$ (TEUs/hour) | U[50; 180] |
| Weekly operational cost of at least one own shipping vessel - $\delta^{own}$ (USD/week) | 200,000 |
| Weekly cost of at least one alternative shipping vessel - $\delta^{char}$ (USD/week) | 300,000 |
| Unit cost of container inventory - $\delta^{inv}$ (USD per TEU per hour) | 0.5 |
| Unit cost of ship late arrival at port p - $\delta_p^{late}$ (USD/hour) | U[5,000; 10,000] |
| Unit cost of ship fuel at voyage leg p - $\delta_p^{fuel}$ (USD/ton) | [200; 500]** |
| Unit cost of ship service under handling rate h at terminal m of port p during time window t - $\delta_{pmth}^{hand}$, p ∈ P, m ∈ $M_p$, t ∈ $T_{pm}$, h ∈ $H_{pmt}$ (USD/TEU) | U[300; 800] |
| Unit cost of ship emissions - $\delta^{emis}$ (USD/ton) | 32* |
| Total number of containers that will be carried at voyage leg p - $\phi_p^{sea}$, p ∈ P (TEUs) | U[5,000; 10,000] |
| Total number of containers that will be handled at port p - $\phi_p^{port}$, p ∈ P (TEUs) | U[200; 1,000] |
| Lower bound on ship sailing speed - $s^{min}$ (knots) | 15 |
| Upper bound on ship sailing speed - $s^{max}$ (knots) | 25 |
| Available number of own shipping vessels for deployment - $q^{own-max}$ (e.g., cargo ship) | 5 |
| Available number of alternative shipping vessels for deployment - $q^{own-char}$ (e.g., cargo ship) | 8 |
| Time window duration at port p - $[\tau_{pmt}^{end} - \tau_{pmt}^{st}]$, p ∈ P, m ∈ $M_p$, t ∈ $T_{pm}$ (hours) | U[12; 24]*** |

Notes:
*The computational experiments were conducted considering carbon dioxide ($CO_2$) as the main pollutant. However, without loss of generality, other pollutants may be evaluated using the proposed model as well.
**Marine gas oil with low sulfur content and the unit cost of 500 USD/ton was used within the English Channel, which is designated as the Emission Control Area. Alternative fuel oil with the unit cost of 200 USD/ton was used for the rest of voyage legs.
***The end time for time window t at terminal m of port p (hours) was generated as follows:

$$\tau_{(p+1)mt}^{end} = \tau_{pmt}^{end} + \frac{\lambda_p}{U[s^{min}; s^{max}]} \quad \forall\ p \in P, m \in M_p, t \in T_{pm}.$$

The computational performance of the traditional ECON method is substantially affected with the desired PF size. Increasing PF size will increase the number of ECON parameter was set to 1.5 based on the preliminary computational experiments, while the target objective violation penalties were set to $\delta^{F_1}=\delta^{F_2}=1.2$ USD/USD.

TABLE 8

| IKI\$PF^{size}$ | 10 | 11 | 12 | 13 | 14 | 15 | 16 | 17 | 18 | 19 | 20 |
|---|---|---|---|---|---|---|---|---|---|---|---|
| 5 | 7.45 | 7.79 | 9.80 | 9.89 | 11.90 | 11.77 | 13.10 | 14.27 | 15.78 | 15.92 | 18.16 |
| 10 | 7.41 | 8.54 | 9.73 | 10.37 | 11.81 | 11.83 | 13.84 | 13.56 | 14.37 | 15.76 | 17.03 |
| 15 | 7.78 | 8.13 | 9.79 | 10.01 | 11.81 | 12.05 | 13.51 | 14.20 | 15.24 | 16.86 | 17.88 |
| 20 | 8.21 | 9.03 | 10.54 | 11.15 | 12.31 | 12.43 | 13.84 | 14.36 | 16.35 | 17.04 | 17.94 |
| 25 | 8.29 | 9.05 | 10.72 | 10.40 | 12.78 | 12.74 | 14.52 | 14.64 | 16.39 | 16.90 | 17.20 |
| 30 | 8.19 | 9.31 | 10.46 | 10.40 | 12.98 | 13.77 | 14.49 | 15.39 | 16.63 | 17.53 | 18.79 |
| 35 | 7.94 | 8.56 | 10.49 | 11.51 | 12.80 | 13.18 | 14.91 | 15.91 | 15.98 | 17.83 | 18.13 |
| 40 | 8.33 | 9.37 | 11.03 | 11.46 | 12.57 | 12.74 | 15.21 | 15.48 | 17.82 | 17.72 | 18.78 |
| 45 | 8.98 | 9.67 | 11.25 | 12.84 | 13.54 | 13.41 | 14.74 | 16.27 | 16.58 | 17.81 | 18.69 |
| 50 | 8.31 | 9.85 | 11.20 | 12.13 | 13.56 | 13.56 | 14.18 | 15.66 | 16.18 | 17.28 | 19.40 | iterations and, hence, will cause a CPU time increase. Since the ECON-GP method is based on the traditional ECON method, its computational performance will be affected with the desired PF size as well. Furthermore, since the original SSP-CAT model was linearized by means of ship sailing speed discretization, the ECON-GP computational performance will be influenced with the adopted discretization level (e.g., a higher discretization level will improve the ship fuel consumption accuracy but will cause a CPU time increase). As a part of the performed experiments, a supplemental analysis was conducted to assess the ECON-GP sensitivity to the desired PF size and the ship sailing speed discretization level. A CPU with Dell Intel(R) Core™ i7 Processor and 32 GB of RAM was utilized to execute ECON-GP for all the developed problem instances. The General Algebraic Modeling System (hereinafter "GAMS") was used to encode the GP, SSP-CATL-1, and SSP-CATL-2 mathematical models, which are directly deployed by ECON-GP. CPLEX with a 0.01% optimality gap was deployed to solve the GP, SSP-CATL-1, and SSP-CATL-2 mathematical models within ECON-GP. The value of $GP^{rol}$ A total of 110 scenarios were evaluated throughout the analysis by changing the desired PF size from 10 points to 20 points with an increment of 1 point and by changing the discretization level from 5 points to 50 points with an increment of 5 points. The average CPU times incurred by ECON-GP for the generated scenarios over the developed problem instances are reported in TABLE 8. As expected, the CPU time generally increased with increasing values of the desired PF size and the ship sailing speed discretization level. However, the CPU time increases were more substantial after increasing the desired PF size when comparing to increases in the discretization level. In particular, the CPU time on average increased from 12.35 seconds to 13.75 seconds after increasing the discretization level from 5 points to 50 points. On the other hand, the CPU time on average increased from 8.09 seconds to 18.20 seconds after increasing the desired PF size from 10 points to 20 points. Nevertheless, the maximum CPU time did not exceed 20 seconds over all the generated scenarios, which may be viewed as acceptable. Therefore, the discretization level will be set to 50 points, while the desired PF size will be set to 20 points for the ECON-GP method throughout the computational experiments.

Figure 7:
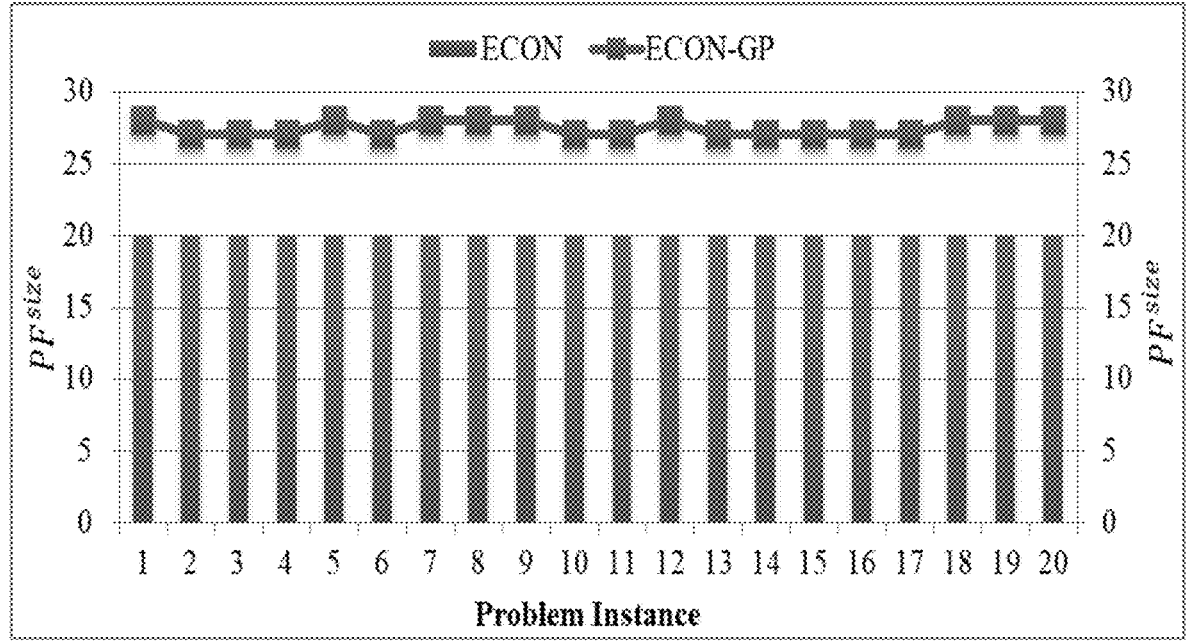
FIG. 7 graphically depicts a PF size of an ECON and an ECON-GP method, according to an embodiment of the present disclosure.
Figures 8A, 8B, 8C, 8D, 8E, 8F, 8G, 8H:
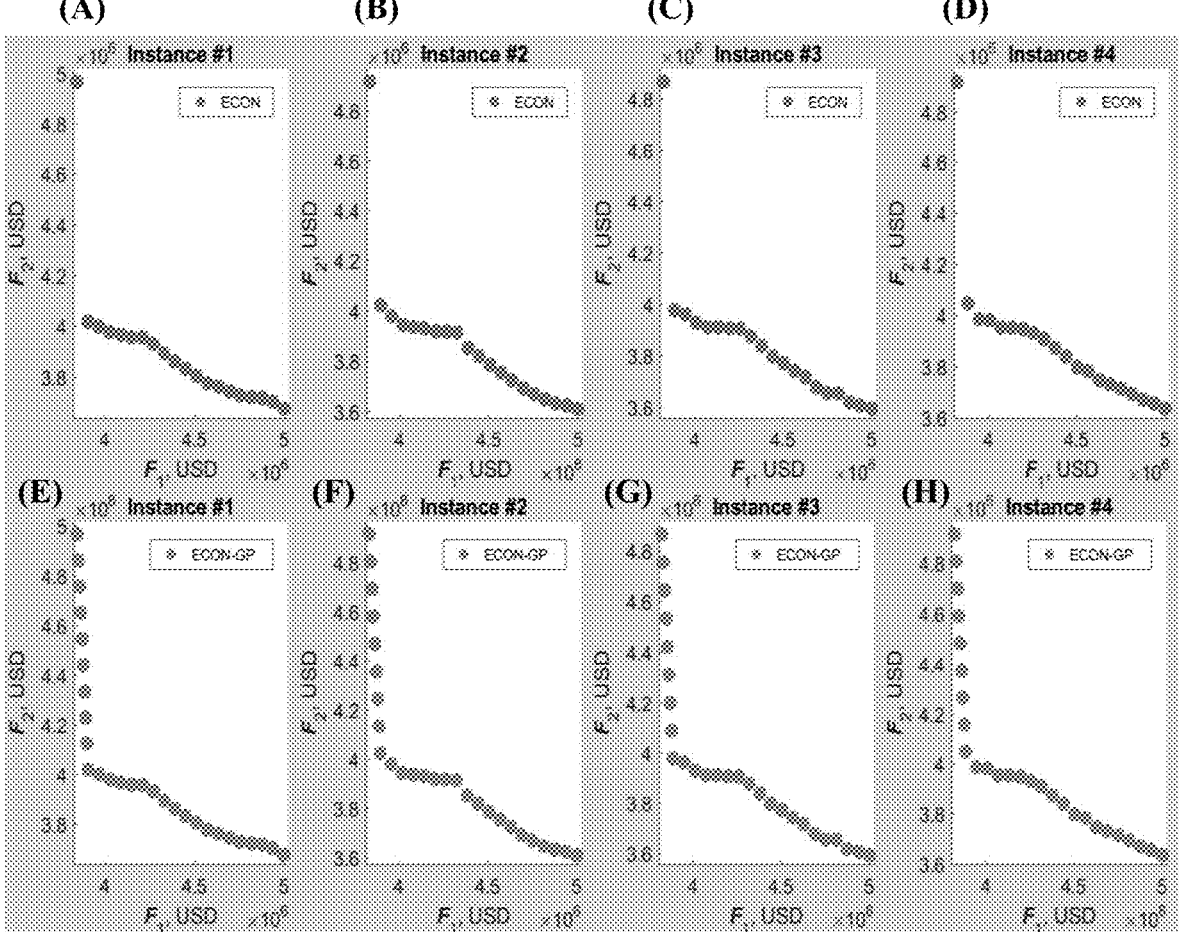
FIGS. 8A-8H graphically depict PF models obtained by an ECON and an ECON-GP method for problem instances, according to an embodiment of the present disclosure.

As a part of the performed experiments, a supplemental analysis was conducted to assess potential advantages of the developed ECON-GP method over the traditional ECON method. The latter task was accomplished by executing the traditional ECON method for all the developed 20 problem instances (e.g., the same instances that were solved by ECON-GP). The results from the performed analysis are summarized in FIG. 7 and FIGS. 8A-8H. As shown in FIG. 7, it may be observed that ECON-GP had to generate a total of 7-8 PF points in addition to the desired PF size of 20 PF points for each of the problem instances developed. Additional PF points were required to meet the acceptable level of PF density. Indeed, as shown in FIGS. 8A-8H, the PF density obtained by the traditional ECON method was not sufficient for the considered problem instances, as significant $F_2$ objective intervals were observed for some of the consecutive PF points. Large objective intervals are not desirable from the practical point of view, as they impose limitations in the analysis of trade-offs amongst the conflicting objectives. On the other hand, the issue of insufficient PF density has been effectively addressed by ECON-GP. Note that FIGS. 8A-8H show the PFs obtained by ECON and ECON-GP for the problem instances "1"-"4". However, the same patterns were observed for the remaining problem instances as well.

As a part of the performed experiments, a supplemental analysis was conducted to evaluate the trade-offs amongst the conflicting objectives in the ship schedule design. The latter task was accomplished by extracting the solution data for the corner PF points obtained by ECON-GP for each one of the considered problem instances. Note that, as shown in FIG. 9, the corner PF points correspond to the points that have the best (e.g., the minimum) values of the objective preferences $F_1$ and $F_2$ and are denoted as $F_1$* and $F_2$*, respectively. The results from the performed analysis are summarized in TABLE 9, where the following data are presented for every corner PF point and every problem instance: (i) the $F_1$ objective preference value; (ii) the $F_2$ objective preference value; (iii) the average ship sailing speed weighted by voyage leg length ($s^W$); (iv) the total ship waiting time at ports ($\tau^{wait}$); (v) the total ship handling time at ports ($\tau^{hand}$); (vi) the total ship shipping time at sea ($\tau^{sail}$); (vii) the total late arrivals of shipping vessels at ports ($\tau^{late}$); (viii) the total ship fuel consumption ($\varphi$); (ix) the total quantity of emissions released at sea ($\xi^{sea}$); (x) the total quantity of emissions released at ports ($\xi^{port}$); (xi) the total number of shipping vessels deployed (q); (xii) the total number of own shipping vessels deployed ($q^{own}$); and (xiii) the total number of alternative (e.g., chartered) shipping vessels deployed ($q^{char}$).

TABLE 9

| Instance | $F_1$, $10^6$ USD | $F_2$, $10^6$ USD | $s^W$, knots | $\tau^{wait}$, hours | $\tau^{hand}$, hours | $\tau^{sail}$, hours | $\tau^{late}$, hours | $\varphi$, tons | $\xi^{sea}$, tons | $\xi^{port}$, tons | q | $q^{own}$ | $q^{char}$ |
|---|---|---|---|---|---|---|---|---|---|---|---|---|---|
| | | | | | Corner Point $F_1$* | | | | | | | | |
| 1 | 3.846 | 4.965 | 25.00 | 55.53 | 101.43 | 683.04 | 2.81 | 4,158.00 | 12,814.96 | 73.08 | 5 | 4 | 1 |
| 2 | 3.835 | 4.916 | 25.00 | 51.09 | 105.87 | 683.04 | 1.48 | 4,158.00 | 12,814.96 | 69.00 | 5 | 4 | 1 |
| 3 | 3.825 | 4.866 | 25.00 | 47.36 | 109.60 | 683.04 | 0.00 | 4,158.00 | 12,814.96 | 64.65 | 5 | 4 | 1 |
| 4 | 3.825 | 4.917 | 25.00 | 60.36 | 96.60 | 683.04 | 0.00 | 4,158.00 | 12,814.96 | 71.95 | 5 | 4 | 1 |
| 5 | 3.825 | 4.894 | 25.00 | 50.54 | 106.42 | 683.04 | 0.00 | 4,158.00 | 12,814.96 | 70.01 | 5 | 4 | 1 |
| 6 | 3.841 | 4.847 | 25.00 | 48.98 | 107.98 | 683.04 | 2.20 | 4,158.00 | 12,814.96 | 70.33 | 5 | 4 | 1 |
| 7 | 3.861 | 4.926 | 25.00 | 56.23 | 100.73 | 683.04 | 3.72 | 4,158.00 | 12,814.96 | 76.34 | 5 | 4 | 1 |
| 8 | 3.846 | 4.966 | 25.00 | 62.24 | 94.72 | 683.04 | 2.48 | 4,158.00 | 12,814.96 | 74.35 | 5 | 4 | 1 |
| 9 | 3.825 | 4.974 | 25.00 | 52.15 | 104.81 | 683.04 | 0.00 | 4,158.00 | 12,814.96 | 70.14 | 5 | 4 | 1 |
| 10 | 3.839 | 4.908 | 25.00 | 54.71 | 102.25 | 683.04 | 1.52 | 4,158.00 | 12,814.96 | 73.00 | 5 | 4 | 1 |
| 11 | 3.839 | 4.981 | 25.00 | 53.95 | 103.01 | 683.04 | 2.68 | 4,158.00 | 12,814.96 | 73.91 | 5 | 4 | 1 |
| 12 | 3.825 | 4.984 | 25.00 | 57.84 | 99.12 | 683.04 | 0.00 | 4,158.00 | 12,814.96 | 77.33 | 5 | 4 | 1 |
| 13 | 3.859 | 4.989 | 25.00 | 55.16 | 101.80 | 683.04 | 3.65 | 4,158.00 | 12,814.96 | 74.80 | 5 | 4 | 1 |
| 14 | 3.848 | 4.980 | 25.00 | 52.31 | 104.65 | 683.04 | 3.32 | 4,158.00 | 12,814.96 | 73.43 | 5 | 4 | 1 |
| 15 | 3.825 | 4.952 | 25.00 | 57.98 | 98.98 | 683.04 | 0.00 | 4,158.00 | 12,814.96 | 75.80 | 5 | 4 | 1 |
| 16 | 3.830 | 4.902 | 25.00 | 57.55 | 99.41 | 683.04 | 0.61 | 4,158.00 | 12,814.96 | 73.31 | 5 | 4 | 1 |
| 17 | 3.829 | 4.956 | 25.00 | 51.35 | 105.61 | 683.04 | 0.64 | 4,158.00 | 12,814.96 | 75.70 | 5 | 4 | 1 |
| 18 | 3.861 | 4.926 | 25.00 | 56.23 | 100.73 | 683.04 | 3.72 | 4,158.00 | 12,814.96 | 76.34 | 5 | 4 | 1 |
| 19 | 3.846 | 4.966 | 25.00 | 62.24 | 94.72 | 683.04 | 2.48 | 4,158.00 | 12,814.96 | 74.35 | 5 | 4 | 1 |
| 20 | 3.825 | 4.974 | 25.00 | 52.15 | 104.81 | 683.04 | 0.00 | 4,158.00 | 12,814.96 | 70.14 | 5 | 4 | 1 |
| Average: | 3.838 | 4.939 | 25.00 | 54.80 | 102.16 | 683.04 | 1.57 | 4,158.00 | 12,814.96 | 72.90 | 5 | 4 | 1 |
| | | | | | Corner Point $F_2$* | | | | | | | | |
| 1 | 5.000 | 3.675 | 20.38 | 37.85 | 132.11 | 838.04 | 26.23 | 2,916.54 | 8,988.78 | 47.91 | 6 | 5 | 1 |
| 2 | 5.000 | 3.609 | 19.58 | 0.32 | 135.45 | 872.24 | 14.39 | 2,757.30 | 8,498.00 | 45.22 | 6 | 5 | 1 |
| 3 | 5.000 | 3.594 | 19.75 | 10.32 | 133.06 | 864.61 | 16.51 | 2,842.02 | 8,759.09 | 46.02 | 6 | 5 | 1 |
| 4 | 5.000 | 3.636 | 19.58 | 0.78 | 135.14 | 872.08 | 14.83 | 2,883.96 | 8,888.37 | 45.79 | 6 | 5 | 1 |
| 5 | 5.000 | 3.688 | 20.40 | 39.99 | 130.99 | 837.01 | 31.29 | 3,053.64 | 9,411.33 | 47.56 | 6 | 5 | 1 |
| 6 | 5.000 | 3.589 | 19.90 | 10.29 | 139.70 | 858.02 | 17.39 | 2,832.26 | 8,729.02 | 42.98 | 6 | 5 | 1 |
| 7 | 5.000 | 3.642 | 20.21 | 29.63 | 133.34 | 845.03 | 25.48 | 2,870.22 | 8,846.03 | 47.83 | 6 | 5 | 1 |
| 8 | 5.000 | 3.604 | 19.74 | 8.40 | 134.50 | 865.10 | 18.47 | 2,884.81 | 8,890.99 | 44.43 | 6 | 5 | 1 |
| 9 | 5.000 | 3.646 | 20.17 | 23.22 | 138.18 | 846.61 | 25.34 | 2,947.84 | 9,085.23 | 43.14 | 6 | 5 | 1 |
| 10 | 5.000 | 3.650 | 20.18 | 28.16 | 133.75 | 846.08 | 31.97 | 2,889.71 | 8,906.08 | 47.50 | 6 | 5 | 1 |
| 11 | 5.000 | 3.621 | 19.71 | 8.23 | 133.47 | 866.29 | 14.83 | 2,801.82 | 8,635.21 | 45.31 | 6 | 5 | 1 |
| 12 | 5.000 | 3.689 | 20.62 | 43.47 | 136.42 | 828.11 | 38.30 | 3,053.26 | 9,410.16 | 46.60 | 6 | 5 | 1 |
| 13 | 5.000 | 3.597 | 19.84 | 7.43 | 139.71 | 860.86 | 21.48 | 2,796.53 | 8,618.90 | 42.89 | 6 | 5 | 1 |
| 14 | 5.000 | 3.579 | 19.69 | 1.93 | 138.88 | 867.19 | 16.43 | 2,718.22 | 8,377.54 | 44.30 | 6 | 5 | 1 |
| 15 | 5.000 | 3.625 | 19.77 | 10.69 | 133.54 | 863.77 | 19.66 | 2,826.80 | 8,712.21 | 47.15 | 6 | 5 | 1 |
| 16 | 5.000 | 3.608 | 19.77 | 5.08 | 139.19 | 863.73 | 16.74 | 2,791.72 | 8,604.08 | 44.46 | 6 | 5 | 1 |
| 17 | 5.000 | 3.595 | 19.57 | 2.42 | 133.02 | 872.56 | 16.18 | 2,711.78 | 8,357.72 | 48.18 | 6 | 5 | 1 |
| 18 | 5.000 | 3.642 | 20.21 | 29.63 | 133.34 | 845.03 | 25.48 | 2,870.22 | 8,846.03 | 47.83 | 6 | 5 | 1 |

TABLE 9-continued

| Instance | $F_1, 10^6$ USD | $F_2, 10^6$ USD | $s^w$, knots | $\tau^{wait}$, hours | $\tau^{hand}$, hours | $\tau^{sail}$, hours | $\tau^{late}$, hours | $\varphi$, tons | $\zeta^{sea}$, tons | $\zeta^{port}$, tons | q | $q^{own}$ | $q^{char}$ |
|---|---|---|---|---|---|---|---|---|---|---|---|---|---|
| 19 | 5.000 | 3.604 | 19.74 | 8.40 | 134.50 | 865.10 | 18.47 | 2,884.81 | 8,890.99 | 44.43 | 6 | 5 | 1 |
| 20 | 5.000 | 3.646 | 20.17 | 23.22 | 138.18 | 846.61 | 25.34 | 2,947.84 | 9,085.23 | 43.14 | 6 | 5 | 1 |
| Average: | 5.000 | 3.627 | 19.95 | 16.47 | 135.32 | 856.20 | 21.74 | 2,864.07 | 8,827.05 | 45.63 | 6 | 5 | 1 |

Based on the outcomes from the performed analysis, it may be observed that the ship schedules with the $F_1$ minimum values (e.g., the $F_1$* ship schedules) are significantly different from the ship schedules with the $F_2$ minimum values (e.g., the $F_2$* ship schedules). In particular, if the shipping line decides to follow the environmental sustainability goals and select the $F_2$* ship schedules, it will have to reduce the ship sailing speed by 25.32% when comparing to the $F_1$* ship schedules. A decrease in the ship sailing speed may reduce the fuel consumption and the associated emissions produced by shipping vessels at sea by more than 45% for the $F_2$* ship schedules. Furthermore, if the shipping line decides to follow the environmental sustainability goals and select the $F_2$* ship schedules, the emissions produced by the designated handling equipment throughout the service of arriving shipping vessels at ports could be reduced by 59.74% when comparing to the $F_1$* ship schedules by means of selecting lower handling rates. However, decreasing sailing speed of shipping vessels and handing rates at ports could increase the amount of time spent at sea and ports of call by 20.22% and 24.51%, respectively. An increase in the amount of time spent at sea and ports of call would further lead to an increase in the total turnaround time of shipping vessels. The conducted experiments show that the shipping line had to deploy an additional ship in each one of the considered problem instances to ensure the weekly port service frequency (e.g., a total of 6 shipping vessels were required for the $F_2$* ship schedules, whereas 5 shipping vessels were sufficient for the $F_1$* ship schedules). Moreover, larger late arrivals (but lower waiting times) were observed at ports for the $F_2$* ship schedules as well.

In general, the $F_2$* ship schedules allowed reducing the $F_2$ objective by 36.18% when comparing to the $F_1$* ship schedules but increased the $F_1$ objective by 23.25%. Note that the corner PF points may be viewed as rather radical ship scheduling decisions (e.g., strictly follow the economic perspectives by selecting the $F_1$* ship schedules or strictly follow the environmental perspectives by selecting the $F_2$* ship schedules). However, there are many intermediate PF points identified by ECON-GP that compromise the conflicting objectives. For instance, as shown in FIG. 9, the PF point "10" not only allows reducing the $F_1$ value by 21.87%, when comparing to the $F_1(F_2$*) point, but also decreases the $F_2$ value by 19.08%, when comparing to the $F_2(F_1$*) point. Additionally, as shown in FIG. 9, the PF point "18" not only allows reducing the $F_1$ value by 12.15%, when comparing to the $F_1(F_2$*) point, but also decreases the $F_2$ value by 22.24%, when comparing to the $F_2(F_1$*) point. Therefore, the developed multi-objective SSP-CATL mathematical model and the proposed ECON-GP solution method may serve as an effective decision support system for shipping lines and assist with the analysis of trade-offs amongst the conflicting objectives in the ship schedule design. More importantly, the proposed solution methodology will assist shipping lines with the identification of ship schedules that will compromise the economic and environmental perspectives.

As a part of the performed experiments, a supplemental analysis was conducted to evaluate potential effects of collaborative agreements amongst the shipping line and terminal operators on the ship schedule design (e.g., the availability of multiple terminals for service of the arriving shipping vessels along with the availability of multiple arrival time windows and handlings rates at those terminals). The latter task was accomplished by analyzing the following scenarios of collaborative agreements: (i) "3MTs-3TWs-4HRs"—the default collaborative agreements where 3 terminals are available at every port of the shipping route, and every terminal operator may offer 3 arrival time windows and 4 handling rates for service of shipping vessels; (ii) "1MT-3TWs-4HRs"—the alternative collaborative agreements where just 1 terminal is available at every port of the shipping route, and the terminal operator may offer 3 arrival time windows and 4 handling rates for service of shipping vessels; (iii) "3MTs-1TW-4HRs"—the alternative collaborative agreements where 3 terminals are available at every port of the shipping route, and every terminal operator may offer just 1 arrival time window and 4 handling rates for service of shipping vessels; and (iv) "3MTs-3TWs-1HR"—the alternative collaborative agreements where 3 terminals are available at every port of the shipping route, and every terminal operator may offer 3 arrival time windows and just 1 handling rate for service of shipping vessels.

The developed ECON-GP method was executed for all the generated scenarios of collaborative agreements and each one of the considered problem instances. FIGS. 10A-11H depict the results from the performed analysis. Based on the conducted analysis, superior PFs were observed for the first scenario of collaborative agreements (e.g., "3MTs-3TWs-4HRs") for each one of the considered problem instances. Such a finding highlights the importance of effective collaborative agreements amongst shipping lines and terminal operators on the ship schedule design as well as the importance of availability of multiple arrival time windows and handlings rates at those terminals for service of the arriving shipping vessels. Collaborative agreements amongst terminal operators and flexibility in terms of selection of arrival time windows and handlings rates allowed the shipping line designing more efficient ship schedules from both economic and environmental perspectives. The quality of PFs started significantly declining after imposing certain restrictions in the existing collaborative agreements. The worst PFs were recorded for the scenario when only one handling rate was available at every terminal of every port for service of the arriving shipping vessels (e.g., scenario "3MT s-3TWs-1HR"). Therefore, effective collaborative agreements amongst shipping lines and terminal operators are essential for sustainable maritime transportation, as they may not only reduce the costs associated with the transportation process itself but also preserve the environment.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

INCORPORATION BY REFERENCE

Abioye, O. F., Dulebenets, M. A., Pasha, J. and Kavoosi, M., 2019. A vessel schedule recovery problem at the liner shipping route with emission control areas. Energies, 12(12), p. 2380.

Adland, R. O. and Jia, H., 2016. Vessel speed analytics using satellite-based ship position data. Paper presented at the 2016 IEEE International Conference on Industrial Engineering and Engineering Management (IEEM).

Alharbi, A., Wang, S., and Davy, P., 2015. Schedule design for sustainable container supply chain networks with terminal operator time windows. Advanced Engineering Informatics, 29(3), pp. 322-331.

Bierwirth, C. and Meisel, F., 2015. A follow-up survey of berth allocation and quay crane scheduling problems in container terminals. European Journal of Operational Research, 244(3), pp. 675-689.

Bouman, E., Lindstad, E., Rialland, A. and Strøngman, A., 2017. State-of-the-art technologies, measures, and potential for reducing GHG emissions from shipping—A review. Transportation Research Part D: Transport and Environment, 52(A), pp. 408-421.

Carlo, H. J., Vis, I. F. and Roodbergen, K. J., 2015. Seaside operations in container terminals: literature overview, trends, and research directions. Flexible Services and Manufacturing Journal, 27(2), pp. 224-262.

Cho, S. W., Park, H. J. and Lee, C., 2021. An integrated method for berth allocation and quay crane assignment to allow for reassignment of vessels to other terminals. Maritime Economics & Logistics, 23(1), pp. 123-153.

CMA CGM, 2021. Europe Pakistan India Consortium 2.

De, A., Mamanduru, V., Gunasekaran, A., Subramanian, N., and Tiwari, M., 2016. Composite particle algorithm for sustainable integrated dynamic ship routing and scheduling optimization. Computers & Industrial Engineering, 96, pp. 201-215.

Deb, K., 1999, July. Solving goal programming problems using multi-objective genetic algorithms. In Proceedings of the 1999 Congress on Evolutionary Computation-CEC99 (Cat. No. 99TH8406) (Vol. 1, pp. 77-84). IEEE.

Dong, G. and Lee, P. T. W., 2020. Environmental effects of emission control areas and reduced speed zones on container ship operation. Journal of Cleaner Production, 274, p. 122582.

Dulebenets, M. A., 2016. Advantages and disadvantages from enforcing emission restrictions within emission control areas. Maritime Business Review, 1(2), pp. 107-132.

Dulebenets, M. A., 2018a. A comprehensive multi-objective optimization model for the vessel scheduling problem in liner shipping. International Journal of Production Economics, 196, pp. 293-318.

Dulebenets, M. A., 2018b. Application of evolutionary computation for berth scheduling at marine container terminals: Parameter tuning versus parameter control. IEEE Transactions on Intelligent Transportation Systems, 19(1), pp. 25-37.

Dulebenets, M. A., 2018c. A novel memetic algorithm with a deterministic parameter control for efficient berth scheduling at marine container terminals. Maritime Business Review, 2(4), pp. 302-330.

Dulebenets, M. A., 2018d. Green vessel scheduling in liner shipping: Modeling carbon dioxide emission costs in sea and at terminal operators of call. International Journal of Transportation Science and Technology, 7(1), pp. 26-44.

Dulebenets, M. A., 2018e. The green vessel scheduling problem with transit time requirements in a liner shipping route with Emission Control Areas. Alexandria Engineering Journal, 57(1), pp. 331-342.

Dulebenets, M. A., 2018f. The vessel scheduling problem in a liner shipping route with heterogeneous fleet. International Journal of Civil Engineering, 16(1), pp. 19-32.

Dulebenets, M. A., 2019. Minimizing the total liner shipping route service costs via application of an efficient collaborative agreement. IEEE Transactions on Intelligent Transportation Systems, 20(1), pp. 123-136.

Dulebenets, M. A., Golias, M. M., and Mishra, S., 2018. A Collaborative Agreement for Berth Allocation under Excessive Demand. Engineering Applications of Artificial Intelligence, 69, pp. 76-92.

Dulebenets, M. A., Pasha, J., Abioye, O. F. and Kavoosi, M., 2021. Vessel scheduling in liner shipping: a critical literature review and future research needs. Flexible Services and Manufacturing Journal, 33(1), pp. 43-106.

Fagerholt, K., 2001. Ship Scheduling with Soft Time Windows: An Optimization Based Approach. European Journal of Operational Research, 131, pp. 559-571.

Fathollahi-Fard, A. M., Hajiaghaei-Keshteli, M. and Mirjalili, S., 2018. Multi-objective stochastic closed-loop supply chain network design with social considerations. Applied Soft Computing, 71, pp. 505-525.

Fathollahi-Fard, A. M., Woodward, L. and Akhrif, O., 2021. Sustainable distributed permutation flow-shop scheduling model based on a triple bottom line concept. Journal of Industrial Information Integration, p. 100233.

Giirel, S. and Shadmand, A., 2019. A heterogeneous fleet liner ship scheduling problem with terminal operator time uncertainty. Central European Journal of Operations Research, 27(4), pp. 1153-1175.

Imai, A., Nishimura, E., and Papadimitriou, S., 2008. Berthing ships at a multi-user container terminal with a limited quay capacity. Transportation Research Part E: Logistics and Transportation Review, 44(1), pp. 136-151.

IMO, 2020. Fourth IMO GHG Study 2020—Final report.

IMO, 2021a. IMO 2020—cutting sulphur oxide emissions.

IMO, 2021b. Air pollution, energy efficiency and greenhouse gas emissions.

JOC, 2020. Houston container terminals to reopen after COVID-19 closures.

Kontovas, C., 2014. The green ship routing and scheduling problem (GSRSP): A conceptual approach. Transportation Research Part D: Transport and Environment, 31, pp. 61-69.

Liu, Z., Wang, S., Du, Y., and Wang, H., 2016. Supply Chain Cost Minimization by Collaboration between Liner Shipping Companies and terminal operator Operators. Transportation Journal, 55(3), pp. 296-314.

Ma, W., Ma, D., Ma, Y., Zhang, J. and Wang, D., 2021. Green maritime: a routing and speed multi-objective optimization strategy. Journal of Cleaner Production, 305, p. 127179.

Mallidis, I., Iakovou, E., Dekker, R., and Vlachos, D., 2018. The impact of slow steaming on the carriers' and shippers' costs: The case of a global logistics network. Transportation Research Part E: Logistics and Transportation Review, 111, pp. 18-39.

Mavrotas, G., 2009. Effective implementation of the ε-constraint method in multi-objective mathematical programming problems. Applied Mathematics and Computation, 213(2), pp. 455-465.

Meng, Q., Wang, S., Andersson, H., and Thun, K., 2014. Containership routing and scheduling in liner shipping: Overview and future research directions. Transportation Science, 48(2), pp. 265-280.

Ozcan, S., Eliiyi, D. and Reinhardt, L., 2020. Cargo allocation and vessel scheduling on liner shipping with synchronization of transshipments. Applied Mathematical Modelling, 77(1), pp. 235-252.

Pasha, J., Dulebenets, M. A., Fathollahi-Fard, A. M., Tian, G., Lau, Y. Y., Singh, P. and Liang, B., 2021. An integrated optimization method for tactical-level planning in liner shipping with heterogeneous ship fleet and environmental considerations. Advanced Engineering Informatics, 48, p. 101299.

Pasha, J., Dulebenets, M. A., Kavoosi, M., Abioye, O. F., Theophilus, O., Wang, H., Kampmann, R. and Guo, W., 2020. Holistic tactical-level planning in liner shipping: an exact optimization approach. Journal of Shipping and Trade, 5(1), pp. 1-35.

Peng, J., Zhou, Z., and Li, R., 2015. A collaborative berth allocation problem with multiple terminal operators based on genetic algorithm. Journal of Coastal Research, 73(1), pp. 290-297.

Peng, Y., Dong, M., Li, X., Liu, H. and Wang, W., 2021. Cooperative optimization of shore power allocation and berth allocation: A balance between cost and environmental benefit. Journal of Cleaner Production, 279, p. 123816.

Ports.com, 2021. Sea route & distance.

Psaraftis, H. N. and Kontovas, C. A., 2013. Speed models for energy-efficient maritime transportation: a taxonomy and survey. Transportation Research Part C: Emerging Technologies, 26, pp. 331-351.

Qi, J., Zheng, J., Yang, L. and Yao, F., 2021. Impact analysis of different container arrival patterns on ship scheduling in liner shipping. Maritime Policy & Management, 48(3), pp. 331-353.

Ronen, D., 2011. The effect of oil price on containership speed and fleet size. Journal of the Operational Research Society, 62(1), pp. 211-216.

Song, D. P., Li, D. and Drake, P., 2015. Multi-objective optimization for planning liner shipping service with uncertain terminal operator times. Transportation Research Part E: Logistics and Transportation Review, 84, pp. 1-22.

Tang, W., Li, H. and Chen, J., 2021. Optimizing carbon taxation target and level: Enterprises, consumers, or both? Journal of Cleaner Production, 282, p. 124515.

Torkian, F., Hoseini, S. F. and Askarpoor, H., 2020. A Berth Allocation Policy by Considering Collaboration between Adjacent Container Terminals. Journal of Quality Engineering and Production Optimization, 5(2), pp. 87-104.

Tran, N. K., Haasis, H. D., and Buer, T., 2017. Container shipping route design incorporating the costs of shipping, inland/feeder transport, inventory and CO2 emission. Maritime Economics & Logistics, 19(4), 667-694.

UNCTAD, 2020. Review of Maritime Transport 2020.

Wang, S. and Meng, Q., 2012. Sailing speed optimization for container ships in a liner shipping network. Transportation Research Part E: Logistics and Transportation Review, 48(3), pp. 701-714.

Wang, S. and Meng, Q., 2017. Container liner fleet deployment: a systematic overview. Transportation Research Part C: Emerging Technologies, 77, pp. 389-404.

Wang, S., Alharbi, A., and Davy, P., 2014. Liner ship route schedule design with terminal operator time windows. Transportation Research Part C: Emerging Technologies, 41, pp. 1-17.

Wang, S., Liu, Z., and Qu, X., 2015. Collaborative mechanisms for berth allocation. Advanced Engineering and Informatics, 29(3), pp. 332-338.

Wang, S., Meng, Q. and Liu, Z., 2013. Bunker consumption optimization methods in shipping: A critical review and extensions. Transportation Research Part E: Logistics and Transportation Review, 53, pp. 49-62.

Wang, Y. and Wang, S., 2021. Deploying, scheduling, and sequencing heterogeneous vessels in a liner container shipping route. Transportation Research Part E: Logistics and Transportation Review, 151, p. 102365.

Wang, Y., Meng, Q., and Kuang, H., 2019. Intercontinental liner shipping service design. Transportation Science, 53(2), pp. 344-364.

Wen, M., Pacino, D., Kontovas C., and Psaraftis, H., 2017. A multiple ship routing and speed optimization problem under time, cost and environmental objectives. Transportation Research Part D: Transport and Environment, 52, pp. 303-321.

Yang, L., Cai, Y., Wei, Y. and Huang, S., 2019. Choice of technology for emission control in terminal operator areas: a supply chain perspective. Journal of Cleaner Production, 240, p. 118105.

Yu, Y., Tu, J., Shi, K., Liu, M. and Chen, J., 2021. Flexible optimization of international shipping routes considering carbon emission cost. Mathematical Problems in Engineering, 2021, p. 6678473

Zhao, Y., Zhou, J., Fan, Y. and Kuang, H., 2020. Sailing speed optimization model for slow steaming considering loss aversion mechanism. Journal of Advanced Transportation, 2020, p. 2157945.

Zhuge, D., Wang, S. and Wang, D. Z., 2021. A joint liner ship path, speed and deployment problem under emission reduction measures. Transportation Research Part B: Methodological, 144, pp. 155-173.

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

It is also to be understood that the following claims are intended to cover all of the generic and specific features of the invention herein described, and all statements of the scope of the invention which, as a matter of language, might be said to fall therebetween.

What is claimed is:

1. A method of automatically facilitating at least one optimal contract component of an agreement for linear shipping vessels, the method comprising the steps of:

selecting, via a processor of a computing device communicatively coupled to at least one shipping vessel through a dedicated hardware controller of the at least one shipping vessel and at least one onboard sensory array, at least one objective preference to be implemented into the agreement, by:

calculating, in-real time, via the processor of the computing device, at least one economic metric, at least one environmental metric, or both, depending on at least one standard metric estimate of the at least one shipping vessel, the at least one terminal operator, or both;

modeling, via the processor of the computing device, each of the at least one economic metric, at least one environmental metric, or both based on the at least one standard metric estimate of the at least one shipping vessel, the at least one terminal operator, or both;

evaluating, via the processor of the computing device, the model associated with each of the at least one economic metric, at least one environmental metrics, or both, wherein the model comprises an algorithm including an &- constraint algorithm (hereinafter "ECON"), a goal programming algorithm (hereinafter "GP"), and a combination of thereof (hereinafter "ECON-GP method"); and determining, via the processor of the computing device, one of the at least one economic metric, at least one environmental metric, or both associated with the optimal model, wherein the ECON-GP method is configured to iteratively change a bound of the at least one economic metric, the at least one environmental metric, or both until the optimal model is obtained; and verifying, via the processor of the computing device, each of a plurality of consecutive PF points of the at least one economic metric, the at least one environmental metric, or both associated with the optimal model comprise a predetermined density associated with the at least one economic metric, the at least one environmental metric, or both;

receiving, via an agreement stored in a memory of the computing device, at least one standard contract component;

comparing, via the processor of the computing device, the at least one selected objective preference with the at least one received contract component; and automatically facilitating, via the processor of the computing device, the at least one optimal contract component of the agreement by:

based on a determination that the at least one received standard contract component minimizes economic losses, emissions, or both of the at least one shipping vessel, maintaining, in real-time, via the dedicated hardware controller interfacing with a propulsion system and a steering system of the at least one shipping vessel, a speed, a course path, or both of the at least one shipping vessel according to the optimal model; and based on a determination that the at least one received standard contract component does not minimize economic losses, emissions, or both of the at least one shipping vessel, via the dedicated hardware controller interfacing with a propulsion system and a steering system of the at least one shipping vessel, adjusting, in real-time, a speed, a course path, or both of the at least one shipping vessel according to the optimal model.

2. The method of claim 1, further including the steps of, after automatically facilitating the optimal contract component of the agreement:

transmitting a notification to at least one user indicative of successful optimization of the at least one optimal contract component; and displaying the at least one optimal contract component on a display device associated with the computing device.

3. The method of claim 2, wherein the display device associated with the computing device comprises a user interface, the display device having a surface configured for interaction by the at least one user, the surface being in electrical communication with the processor to allow the at least one user to accept or both or decline the at least one optimal contract component.

4. The method of claim 2, further including the steps of, after automatically facilitating the at least one optimal contract component of the agreement:

updating, via the processor of the computing device, the model, wherein the ECON- GP method is configured to integrate the at least one selected objective preference, the at least one received standard contract component, or both, as at least one data point in the model, by:

based on a determination that the at least one received standard contract component matches the at least one selected objective preference, deactivating the at least one objective preference; and based on a determination that the at least one received standard contract component does not match the at least one selected objective preference, activating the at least one objective preference and converting the at least one received standard contract component to the at least one objective preference according to the at least one metric of the optimal model; and displaying, via the processor of the computing device, the updated model on the display device associated with the computing device.

5. The method of claim 1, further including the steps of, after automatically facilitating the at least one optimal contract component of the agreement:

receiving an instruction to unload, from the memory of the computing device, the at least one received standard contract component; and receiving at least one alternative standard contract component, via the agreement.

6. The method of claim 1, further including the step of, after automatically facilitating the at least one optimal contract component of the agreement, optimizing at least one metric of the at least one terminal operator based on the at least one optimal contract component of the agreement.

7. The method of claim 6, wherein the at least one metric of the at least one terminal operator includes a service output by at least one designated handling equipment of the at least one terminal operator, an amount of terminal operators in communication with the at least one shipping vessel, or both.

8. The method of claim 6, wherein the at least one shipping vessel is in communication with the at least one terminal operator, at least one alternative shipping vessel, or both, and whereby based on the at least one optimal contract component, the at least one shipping vessel is configured to add, remove, or both the at least one terminal operator, the at least one alternative shipping vessel, or both, allowing the at least one shipping vessel to meet a service frequency requirement of the agreement thereby optimizing a service efficiency of the at least one shipping vessel.

9. An agreement optimization system for automatically facilitating at least one optimal contract component of an agreement for linear shipping vessels, the agreement optimization system comprising:

a computing device having a processor, wherein the computing device is in communication with at least one shipping vessel, at least one terminal operator, or both;

a dedicated hardware controller onboard the at least one shipping vessel, the dedicated hardware controller interfacing with a propulsion system and a steering system of the at least one shipping vessel;

at least one onboard sensor array on the at least one shipping vessel, the onboard sensor array providing real-time operational data to the computing device; and a non-transitory computer-readable medium operably coupled to the processor, the computer-readable medium having computer-readable instructions stored thereon that, when executed by the processor, cause the agreement optimization system to automatically facilitate at least one optimal contract component of an agreement by executing instructions comprising:

selecting, via the processor of the computing device communicatively coupled to at least one shipping vessel through a dedicated hardware controller of the at least one shipping vessel and at least one onboard sensory array, at least one objective preference to be implemented into the agreement, by:

calculating, in-real time, via the processor of the computing device, at least one economic metric, at least one environmental metric, or both, depending on at least one standard metric estimate of the at least one shipping vessel, the at least one terminal operator, or both;

modeling, via the processor of the computing device, each of the at least one economic metric, at least one environmental metric, or both based on the at least one standard metric estimate of the at least one shipping vessel, the at least one terminal operator, or both;

evaluating, via the processor of the computing device, the model associated with each of the at least one economic metric, at least one environmental metrics, or both, wherein the model comprises an algorithm including an 8-constraint algorithm (hereinafter "ECON"), a goal programming algorithm (hereinafter "GP"), and a combination of thereof (hereinafter "ECON-GP method");

determining, via the processor of the computing device, one of the at least one economic metric, at least one environmental metric, or both associated with the optimal model, wherein the ECON-GP method is configured to iteratively change a bound of the at least one economic metric, the at least one environmental metric, or both until the optimal model is obtained; and verifying, via the processor of the computing device, each of a plurality of consecutive PF points of the at least one economic metric, the at least one environmental metric, or both associated with the desired optimal model comprise a predetermined density associated with the at least one economic metric, the at least one environmental metric, or both;

receiving, via an agreement stored in a memory of the computing device, at least one standard contract component;

comparing, via the processor of the computing device, the at least one selected objective preference with the at least one received contract component; and automatically facilitating, via the processor of the computing device, the at least one optimal contract component of the agreement by:

based on a determination that the at least one received standard contract component minimizes economic losses, emissions, or both of the at least one shipping vessel, maintaining, in real-time, via the dedicated hardware controller interfacing with a propulsion system and a steering system of the at least one shipping vessel, a speed, a course path, or both of the at least one shipping vessel according to the optimal model; and based on a determination that the at least one received standard contract component does not minimize economic losses, emissions, or both of the at least one shipping vessel, via the dedicated hardware controller interfacing with a propulsion system and a steering system of the at least one shipping vessel, adjusting, in real-time, a speed, a course path, or both of the at least one shipping vessel according to the optimal model.

10. The agreement optimization system of claim 9, wherein the executed instructions further include, after automatically facilitating the at least one optimal contract component of the agreement, transmitting a notification to at least one user indicative of successful optimization of the at least one optimal contract component.

11. The agreement optimization system of claim 10, wherein the executed instructions further comprise, after automatically facilitating the at least one optimal contract component of the agreement, displaying the at least one optimal contract component on a display device associated with the computing device.

12. The agreement optimization system of claim 11, wherein the display device associated with the computing device comprises a user interface, whereby the display device comprises a surface configured to be interacted with by the at least one user, the surface being in electrical communication with the processor, thereby allowing the at least one user to accept, decline, or both the at least one optimal contract component.

13. The agreement optimization system of claim 11, wherein the executed instructions further comprise the steps of, after automatically facilitating the at least one optimal contract component of the agreement:

updating, via the processor of the computing device, the model, wherein the ECON-GP method is configured to integrate the at least one selected objective preference, the at least one received standard contract component, or both, as at least one data point in the model, by:

based on a determination that the at least one received standard contract component matches the at least one selected objective preference, maintaining, in real-time, the at least one economic metric, environmental metric, or both of the at least one shipping vessel, at least one terminal operator, or both; and based on a determination that the at least one received standard contract component does not match the at least one selected objective preference, adjusting, in real-time, the at least one economic metric, environmental metric, or both of the at least one shipping vessel, at least one terminal operator, or both, according to the at least one selected objective preference; and displaying, via the processor of the computing device, the updated model on the display device associated with the computing device.

14. The agreement optimization system of claim 9, wherein the executed instructions further comprise the steps of, after automatically facilitating the at least one optimal contract component of the agreement:

receiving an instruction to unload, from the memory of the computing device, the at least one received standard contract component; and receiving at least one alternative standard contract component, via the agreement.

15. The agreement optimization system of claim 9, wherein the executed instructions further include, after automatically facilitating the at least one optimal contract component of the agreement, optimizing at least one metric of at least one shipping vessel, terminal operator, or both, based on the at least one optimal contract component of the agreement.

16. The agreement optimization of claim 15, wherein the at least one shipping vessel is in communication with the at least one terminal operator, at least one alternative shipping vessel, or both, and whereby based on the at least one optimal contract component, the at least one shipping vessel is configured to add, remove, or both the at least one terminal operator, the at least one alternative shipping vessel, or both, allowing the at least one shipping vessel to meet a service frequency requirement of the agreement thereby optimizing a service efficiency of the at least one shipping vessel.

17. A method of automatically facilitating at least one environmentally optimal contract component of an agreement between at least one shipping vessel and at least one terminal operator, the method comprising the steps of:

selecting, via a processor of a computing device communicatively coupled to the at least one shipping vessel through a dedicated hardware controller of the at least one shipping vessel and an onboard sensory array, at least one environmental preference to be implemented into the agreement, wherein an ECON-GP method is configured to iteratively change a bound of the at least one environmental metric until a desired optimal model is obtained;

verifying, via the processor of the computing device, each of a plurality of consecutive PF points of the at least one environmental metric associated with the desired optimal model comprise a predetermined density associated with the at least one environmental metric;

receiving, via the agreement of the computing device, at least one standard contract component;

comparing, via the processor of the computing device, the at least one selected environmental preference with the at least one received contract component;

automatically facilitating, via the processor of the computing device, the at least one environmentally optimal contract component of the agreement by:

based on a determination that the at least one received standard contract component minimizes emissions of the at least one shipping vessel, maintaining, in real-time, via the dedicated hardware controller interfacing with a propulsion system and a steering system of the at least one shipping vessel, a speed, a course path, or both of the at least one shipping vessel according to the optimal model; and based on a determination that the at least one received standard contract component does not minimize emissions of the at least one shipping vessel, adjusting, in real-time, via the dedicated hardware controller interfacing with the propulsion system and the steering system of the at least one shipping vessel, a speed, a course path, or both of the at least one shipping vessel according to the optimal model.

18. The method of claim 17, further including the steps of, after automatically facilitating the optimal contract component of the agreement:

receiving an instruction to unload, from the memory of the computing device, the at least one contract component;

based on a determination that the at least one received standard contract component matches the at least one selected environmental preference, after receiving the instruction to unload the at least one contract component, retaining the at least one original standard contract component; and based on a determination that the at least one received standard contract component failed to match the at least one selected environmental preference, after receiving the instruction to unload the at least one contract component, activating the at least one objective preference and converting the at least one received standard contract component to the at least one environmental preference according to the at least one metric of the optimal model.

19. The method of claim 17, wherein the at least one contract component includes a service output by at least one designated handling equipment of the at least one terminal operator, an amount of terminal operators in communication with the at least one shipping vessel, or both.

* * * * *